United States Patent
Jeon et al.

(10) Patent No.: US 9,516,150 B2
(45) Date of Patent: Dec. 6, 2016

(54) COVER FOR ELECTRONIC DEVICE, ANTENNA ASSEMBLY, ELECTRONIC DEVICE, AND METHOD FOR MANUFACTURING THE SAME

(71) Applicant: SAMSUNG ELECTRO-MECHANICS CO., LTD., Suwon-Si, Gyeonggi-Do (KR)

(72) Inventors: Dae Seong Jeon, Suwon-Si (KR); Jong Lae Kim, Suwon-Si (KR); Kang Ryong Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 64 days.

(21) Appl. No.: 14/459,194

(22) Filed: Aug. 13, 2014

(65) Prior Publication Data

US 2015/0050968 A1 Feb. 19, 2015

(30) Foreign Application Priority Data

Aug. 14, 2013 (KR) ........................ 10-2013-0096933
Jan. 29, 2014 (KR) ........................ 10-2014-0011684

(51) Int. Cl.
| | |
|---|---|
| H04M 1/00 | (2006.01) |
| H04M 1/02 | (2006.01) |
| H01Q 1/24 | (2006.01) |
| H01Q 7/04 | (2006.01) |
| H01Q 9/40 | (2006.01) |
| C25D 5/02 | (2006.01) |
| C25D 5/48 | (2006.01) |
| C25D 7/00 | (2006.01) |
| C25D 11/04 | (2006.01) |
| C25D 11/26 | (2006.01) |
| C25D 11/30 | (2006.01) |
| C25D 11/02 | (2006.01) |

(52) U.S. Cl.
CPC ............ *H04M 1/0202* (2013.01); *C25D 5/022* (2013.01); *C25D 5/48* (2013.01); *C25D 7/00* (2013.01); *C25D 11/022* (2013.01); *C25D 11/04* (2013.01); *C25D 11/26* (2013.01); *C25D 11/30* (2013.01); *H01Q 1/243* (2013.01); *H01Q 7/04* (2013.01); *H01Q 9/40* (2013.01)

(58) Field of Classification Search
USPC ........................ 455/575.1, 550.1; 343/700 R
See application file for complete search history.

(56) References Cited

U.S. PATENT DOCUMENTS

| | | | |
|---|---|---|---|
| 7,283,853 B2 * | 10/2007 | Kanazawa | H01Q 1/243 455/347 |
| 2002/0053992 A1 | 5/2002 | Kawakami et al. | |

(Continued)

FOREIGN PATENT DOCUMENTS

| | | |
|---|---|---|
| CN | 102405556 A | 4/2012 |
| EP | 2372840 A2 | 10/2011 |

(Continued)

OTHER PUBLICATIONS

Japanese Office Action issued on May 12, 2015 in counterpart Japanese Patent Application No. 2014-164715 (7 pages, with English translation).

(Continued)

*Primary Examiner* — Fayyaz Alam
(74) *Attorney, Agent, or Firm* — NSIP Law

(57) ABSTRACT

A cover for an electronic device may include a metal plate having a first metal region formed of a metal; a through-hole formed in a portion of the first metal region of the metal plate; and an electrical open path extending from the through-hole to an end portion on one side of the first metal region through metal oxidation.

20 Claims, 29 Drawing Sheets

(56) References Cited

U.S. PATENT DOCUMENTS

| | | | |
|---|---|---|---|
| 2009/0201116 A1 | 8/2009 | Orihara | |
| 2009/0231215 A1* | 9/2009 | Taura | H01Q 1/243 343/702 |
| 2010/0326707 A1 | 12/2010 | Kwon et al. | |
| 2012/0262357 A1 | 10/2012 | Kato et al. | |
| 2013/0048347 A1 | 2/2013 | Shiu et al. | |
| 2014/0125528 A1* | 5/2014 | Tsai | H01Q 13/106 343/702 |
| 2015/0009077 A1* | 1/2015 | Lee | H01Q 1/243 343/702 |

FOREIGN PATENT DOCUMENTS

| | | |
|---|---|---|
| EP | 2424041 A1 | 2/2012 |
| JP | 2000-77335 A | 3/2000 |
| JP | 2002-111363 A | 4/2002 |
| JP | 2007-324865 A | 12/2007 |
| JP | 2009-038722 A | 2/2009 |
| JP | 2010-534950 A | 11/2010 |
| JP | 4687832 B2 | 5/2011 |
| JP | 4993045 A | 5/2012 |
| WO | 2011/076582 A1 | 6/2011 |

OTHER PUBLICATIONS

European Search Report dated Jan. 8, 2015 issued in corresponding European Patent Application No. 14275167.6.

Korean Office Action issued on Aug. 27, 2015, in counterpart Korean Application No. 10-2014-0011684 (11 pages in English, 8 pages in Korean).

Chinese Office Action issued on Sep. 18, 2016, in counterpart Chinese Application No. 201410397550.0 (26 pages with English translation)

* cited by examiner

COVER FOR ELECTRONIC DEVICE, ANTENNA ASSEMBLY, ELECTRONIC DEVICE, AND METHOD FOR MANUFACTURING THE SAME

CROSS-REFERENCE TO RELATED APPLICATIONS

This application claims the benefit of Korean Patent Application Nos. 10-2013-0096933 filed on Aug. 14, 2013 and 10-2014-0011684 filed on Jan. 29, 2014, with the Korean Intellectual Property Office, the disclosures of which are incorporated herein by reference.

BACKGROUND

The present disclosure relates to a cover for an electronic device, an antenna assembly, an electronic device, and a method for manufacturing the same.

In general, antennas may be classified as external antennas installed outside of electronic devices and internal antennas installed inside of electronic devices. Interest in internal antennas has been increasing to provide various advantages in terms of ease in usage, a design, and the like.

With the advancement of communication technologies, portable terminals such as cellular phones have become multifunctional in order to provide functions such as a voice call, text communications, electronic payments, and the like, and antennas installed in portable terminals have also been diversified.

In addition, as development of portable terminals have moved towards high quality in terms of design, thicknesses of portable terminals have been increasingly reduced, while screens thereof have been increased in size. Thus, in order to reinforce strength thereof, metal is increasingly employed as a material for a cover (or a case, hereinafter generally referred to as a 'cover') forming an outer casing of electronic devices.

However, the employment of metal as a material for covers of portable terminals may negatively affect antenna performance in portable terminals and there may be negative aspects in that human bodies may be sensitive to electromagnetism from portable terminals formed of metal.

Thus, in the case of portable terminals, if antennas for main communications, as well for communications schemes such as a GPS, BT/Wi-Fi, or the like, are disposed on the upper and lower sides of portable terminals and the entirety of covers thereof are formed of metal, antenna performance may be degraded. In order to overcome the shortcomings, for example, a region of a cover in which an antenna is disposed may at least be formed of a material other than metal.

Also, in case of near field communications (NFC) antennas, increasingly employed in portable terminals, such NFC antennas may be disposed in an extra region, except for regions in which the antennas for main communication and for communications schemes such as GPS, BT/Wi-Fi, or the like, are disposed, as mentioned above. For example, the NFC antenna may be directly attached to a battery or attached to a battery cover. Namely, in consideration of arrangement areas of the other antennas, the NFC antenna may be disposed at the center of a rear surface of a portable terminal or in the vicinity of the center. In this case, however, such an arrangement of the NFC antenna may degrade performance when a metal cover is employed, which, thus, is a problem which remains to be solved.

As discussed above, there are limitations in forming the covers of existing portable terminals employing NFC antennas of metal, and thus, in some cases, upper and lower sides in which antennas for main communications and for communication schemes such as GPS, BT/Wi-Fi, or the like, are arranged are formed of a non-metallic material such as plastic.

However, the formation of a single cover of a portable terminal with different materials such as metal and a non-metallic material may result in a complicated process in terms of manufacturing and may be disadvantageous in terms of time and cost.

In addition, in a case in which an NFC camera is employed in a portable terminal including a metal cover, if an NFC antenna pattern coil is disposed on an inner surface of the metal cover, a repulsive magnetic field may be generated according to Lenz's law, resulting in the formation of an eddy current in a direction opposite a direction of a current flowing in the antenna pattern coil so as to interfere with current flow of the antenna pattern coil. This degrades performance of the NFC antenna.

In order to address this problem, in an existing portable terminal, there has been an attempt to form a physical slit such that a hole formed in a cover of a portable terminal communicates with an end portion of the edge of the cover formed of metal to reduce the generation of eddy currents to thus enhance antenna performance.

However, the formation of a slit in the metal cover may mar an aesthetic appearance of such a metal case. Thus, in order to prevent the slit from being exposed, an additional member needs to be attached and a surface thereof needs to be painted. Namely, additional operations need to be inevitably performed.

Meanwhile, as metal has been increasingly employed as a material of a cover of electronic devices such as smartphones as mentioned above, a need exists for a metal cover for an electronic devices used as an antenna.

SUMMARY

An exemplary embodiment in the present disclosure may provide a cover for an electronic device formed of metal that can be utilized as an antenna even without a physical slit and that can change a path of an eddy current using an electrical opening region and/or an open path without forming a physical slit therein, an antenna assembly, an electronic device, and a manufacturing method thereof.

According to an exemplary embodiment in the present disclosure, a cover for an electronic device may include: a metal plate having a first metal region and a second metal region formed of a metal; an electrical open path formed in the metal plate and configured to electrically separate the first metal region and the second metal region each other; and an antenna radiation part arranged in the second metal region.

In an exemplary embodiment in the present disclosure, the electrical open path may include: a concave recess having a concave shape disposed along the boundary between the first metal region and the second metal region; and a metal oxide layer formed by demetallizing the metal from an inner lower surface of the concave recess to the surface of the metal plate in which the concave recess is formed though metal oxidation.

According to a second exemplary embodiment in the present disclosure, a cover for an electronic device may include: a metal plate having a first metal region formed of a metal; a through-hole formed in a portion of the first metal region of the metal plate; and an electrical open path extending from the through-hole to an end of the first metal region through metal oxidation.

According to a third exemplary embodiment in the present disclosure, a cover for an electronic device may include: a metal plate having a first metal region formed of a metal; an electrical open region formed at a portion of the first metal region of the metal plate through metal oxidation; and an electrical open path extending from the electrical open region to an end of the first metal region through metal oxidation.

In the first, second, and third exemplary embodiment, the cover for an electronic device may further include a non-metallic member disposed on the metal plate to cover the electrical open path.

According to a fourth exemplary embodiment in the present disclosure, an antenna assembly may include: a cover for an electronic device with at least a portion thereof formed of a metal; and an antenna module disposed inside the cover for an electronic device, wherein the cover for an electronic device includes: a metal plate having a first metal region formed of a metal; a through-hole formed in a portion of the first metal region of the metal plate; and an electrical open path extending from the through-hole to an end of the first metal region through metal oxidation.

According to a fifth exemplary embodiment in the present disclosure, an antenna assembly may include: a cover for an electronic device with at least a portion thereof formed of a metal; and an antenna module disposed inside of the cover for an electronic device, wherein the cover for an electronic device includes: a metal plate having a first metal region formed of a metal; an electrical open region formed at a portion of the first metal region of the metal plate through metal oxidation; and an electrical open path extending from the electrical open region to an end of the first metal region through metal oxidation.

In the fifth exemplary embodiment in the present disclosure, the cover for an electronic device may further include a non-metallic member disposed on the metal plate to cover the electrical open region and the electrical open path.

According to a sixth exemplary embodiment in the present disclosure, an electronic device may include: a cover for an electronic device with at least a portion thereof formed of a metal; an antenna module disposed inside the cover for an electronic device; and a main body of the electronic device including an electric circuit electrically coupled to the antenna module, wherein the cover for an electronic device includes: a metal plate having a first metal region formed of a metal; a through-hole formed in a portion of the first metal region of the metal plate; and an electrical open path extending from the through-hole to an end of the first metal region through metal oxidation.

In the second, fourth, and sixth exemplary embodiment in the present disclosure, the electrical open path may include: a concave recess formed of a metal from the electrical open region to an end portion on one side of the first metal region; and a metal oxide layer formed by demetallizing the metal from an inner lower surface of the concave recess to the surface of the metal plate in which the concave recess is formed.

According to a seventh exemplary embodiment in the present disclosure, an electronic device may include: a cover for an electronic device with at least a portion thereof formed of a metal; an antenna module disposed inside the cover for an electronic device; and a main body of the electronic device including an electric circuit electrically coupled to the antenna module, wherein the cover for an electronic device includes: a metal plate having a first metal region formed of a metal; an electrical open region formed at a portion of the first metal region of the metal plate through metal oxidation; and an electrical open path formed by demetallizing the metal from the electrical open region to an end of the first metal region through metal oxidation.

In the first to seventh exemplary embodiment in the present disclosure, the metal may be formed by at least one among deposition, plating, and painting processes. The metal oxidation may be an anodizing process.

In the third, fifth, and seventh exemplary embodiment in the present disclosure, the electrical open region may include: a concave recess having a concave shape in a portion of the first metal region; and a metal oxide layer formed by demetallizing the metal from an inner lower surface of the concave recess to the other surface of the opposite side through metal oxidation.

The electrical open path may include: a concave recess formed of a metal from the electrical open region to an end portion on one side of the first metal region; and a metal oxide layer formed by demetallizing the metal from an inner lower surface of the concave recess to the other surface of the opposite side.

According to an eighth exemplary embodiment in the present disclosure, a method for manufacturing a cover for an electronic device may include: preparing a metal plate having a first metal region formed of a metal; and forming an electrical open path formed at a portion of the metal of the metal plate through metal oxidation to provide a second metal region electrically separate from the first metal region of the metal plate.

In the eighth exemplary embodiment in the present disclosure, the method may further include demetallizing a portion of the second metal region to form an antenna radiation part including an antenna pattern formed as a non-oxidized metal region by the demetallized portion.

The forming of an electrical open path may include: forming a concave recess along the boundary between the first metal region and the second metal region; and demetallizing the metal from an inner lower surface of the concave recess to the surface of the metal plate in which the concave recess is formed through metal oxidation to form a metal oxide layer.

According to a ninth exemplary embodiment in the present disclosure, a method for manufacturing a cover for an electronic device may include: preparing a metal plate having a first metal region formed of a metal; forming a through-hole in a portion of the first metal region of the metal plate to allow spatial electromagnetic waves to enter and exit therethrough; and demetallizing the metal from the through-hole to an end of the first metal region through metal oxidation to form an electrical open path.

According to a tenth exemplary embodiment in the present disclosure, a method for manufacturing a cover for an electronic device may include: preparing a metal plate having a first metal region formed of a metal; forming an electrical open region by demetallizing a portion of the first metal region through metal oxidation to allow spatial electromagnetic waves to enter and exit therethrough; and demetallizing the metal from the electrical open region to an end of the first metal region through metal oxidation to form an electrical open path.

In the first to tenth exemplary embodiment in the present disclosure, the metal may be formed by at least one of deposition, plating, and painting processes. Also, the metal may include at least one among aluminum, magnesium, zinc, titanium, stainless steel, and iron.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
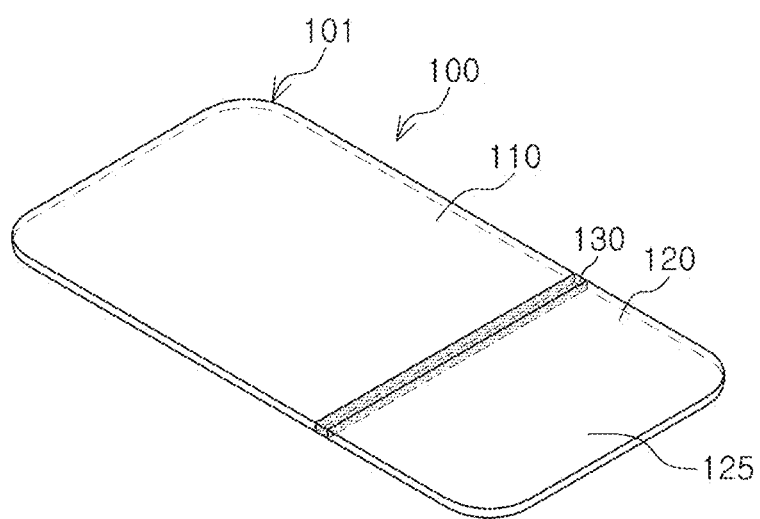
FIG. 1 is a perspective view illustrating a cover for an electronic device according to an exemplary embodiment in the present disclosure.

Hereinafter, exemplary embodiments will be described in detail with reference to the accompanying drawings in the present disclosure.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a perspective view illustrating a cover for an electronic device according to an exemplary embodiment in the present disclosure.

Referring to FIG. 1, a cover 100 for an electronic device according to an exemplary embodiment of the present disclosure may include a metal plate 101, an electrical open path 130, and an antenna radiation part 125.

At least a portion of the metal plate 101 may be formed of a metal, and the metal plate 101 may include a first metal region 110 and a second metal region 120 formed of a metal.

For example, the entirety of the metal plate 101 may be formed of a metal, or a portion of the metal plate 101 may be formed of a metal.

Here, the metal may be formed by a least one of deposition, plating, and painting processes.

Also, the metal plate 101 according to an exemplary embodiment of the present disclosure may have a planar surface, a curved surface, a partially curved surface, or the like, and a shape and a surface form thereof is not particularly limited. However, the cover 100 for an electronic device including the metal plate 101 may be used as a metal cover of an electronic device that needs an antenna, and in this case, the metal plate 101 may have a shape and structure appropriate for the applied electronic device.

The electrical open path 130 may be formed by demetallizing (or unmetallating) a portion of the metal of the metal plate 101 through an oxidation process, to electrically separate the first metal region 110 and the second metal region 120 each other.

The metal oxidation process is an oxidation process performed to oxidize a metal into a nonmetal. For example, an anodizing process (or an anodic oxidation) may be applied as the oxidation process, but the present disclosure is not limited thereto.

The anodizing process may also be simply known as anodizing, a term that means [anode+oxidizing]. When a cathode rod and an anodic metal product (metal plate) are inserted into a reactor filled with an electrolyte, surfaces of the metal produce are corroded (hereinafter, referred to as "oxidation") according to an oxidation equation below.

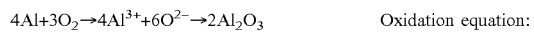
Oxidation equation: $4Al + 3O_2 \rightarrow 4Al^{3+} + 6O^{2-} \rightarrow 2Al_2O_3$ Here, in each embodiment of the present disclosure, a metal of the metal plate may include at least one among aluminum (Al), magnesium (Mg), zinc (Zn), titanium (Ti), stainless steel (SUS), and iron (Fe). However, the present disclosure is not limited thereto and any material may be used as long as it is conductive. Here, if a voltage of an anode is sufficiently high, erosion of an electrolyte, damage to a coating, and generation of the coating are repeated to grow the coating internally, and the coating becomes ceramic through a thickness thereof, resulting in the formation of a metal oxide layer having excellent electrical insulation, corrosion resistance, and wear resistance properties.

The anodizing process is proposed as an example of metal oxidation to help understand the present disclosure, and the present disclosure is not limited thereto.

The antenna radiation part 125 may be formed in the second metal region 120.

When the first metal region 110 and the second metal region 120 are electrically separated, although the first metal region 110 of the metal plate 101 is grounded, the second metal region 120 may be used as an antenna radiation part electrically separated from the first metal region 110.

For example, the antenna radiation part 125 may act as an antenna as the second metal region 120 itself is electrically connected or electromagnetically coupled to an electric circuit unit or an internal antenna inside an electronic device.

An electronic device regarding an exemplary embodiment of the present disclosure may be any electronic product that requires an antenna, such as a smartphone, a TV broadcast receiving set-top box, a notebook computer, a television set, or the like, and hereinafter, a portable terminal will mainly be described as an example of an electronic device, but the present disclosure is not limited thereto and any electronic product may be employed as an electronic device. Some examples thereof will be described with reference to FIGS. 2 through 4.

Figure 2:
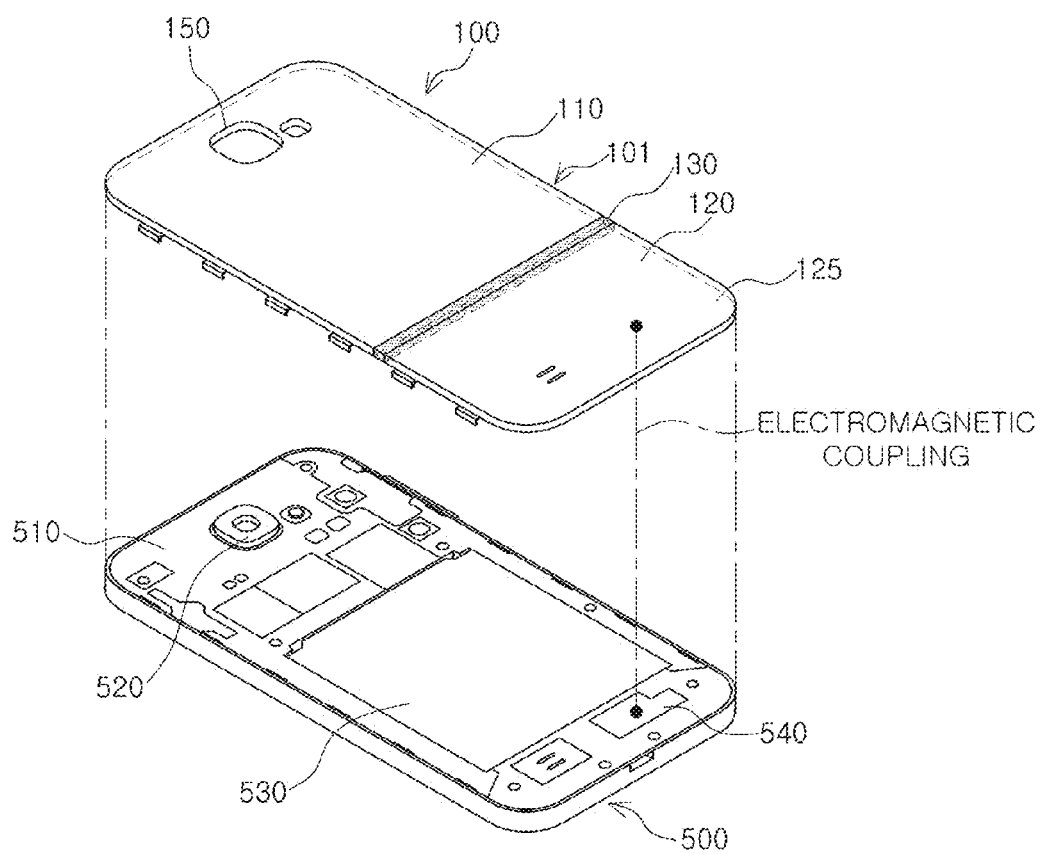
FIGS. 2 through 4 are views illustrating configurations of a cover for an electronic device according to an exemplary embodiment in the present disclosure.
Figure 3:
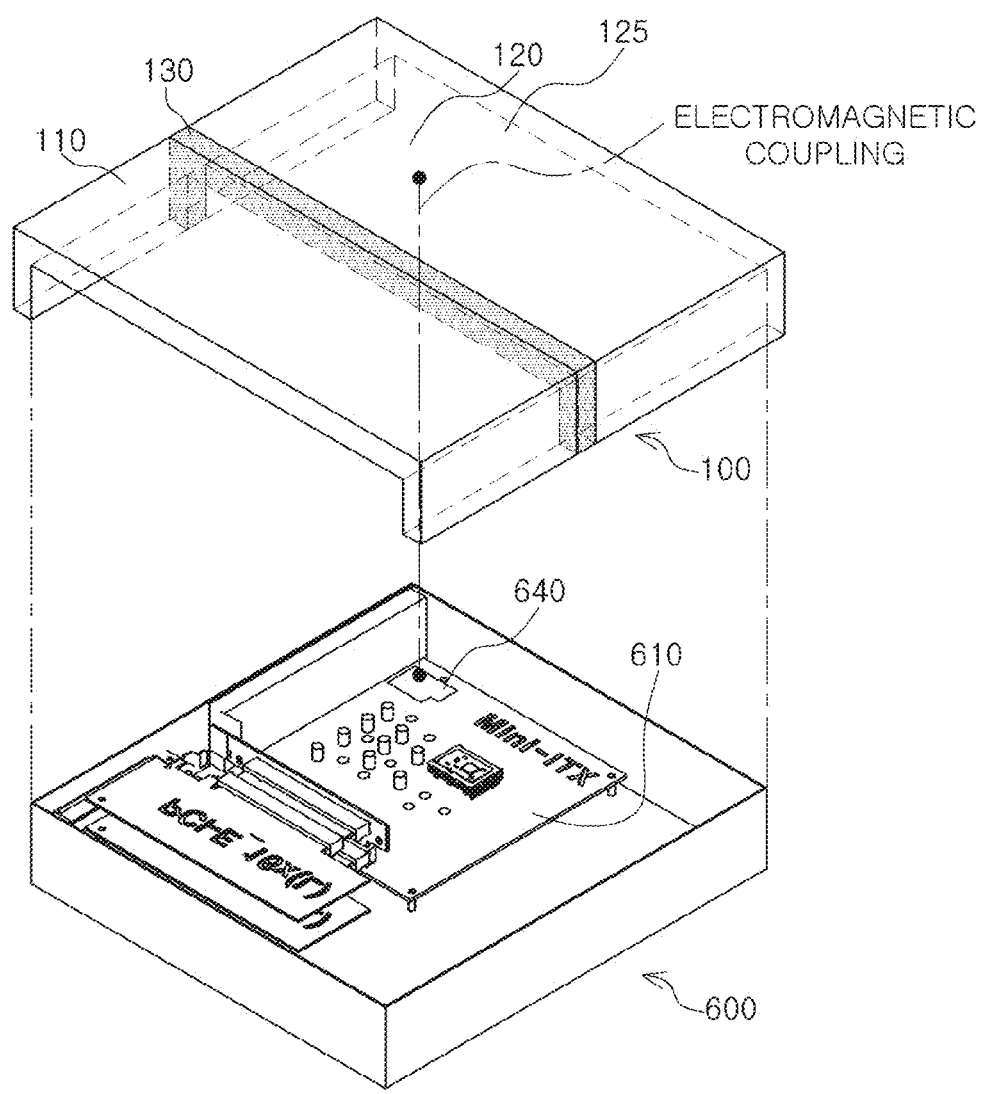
Figure 4:
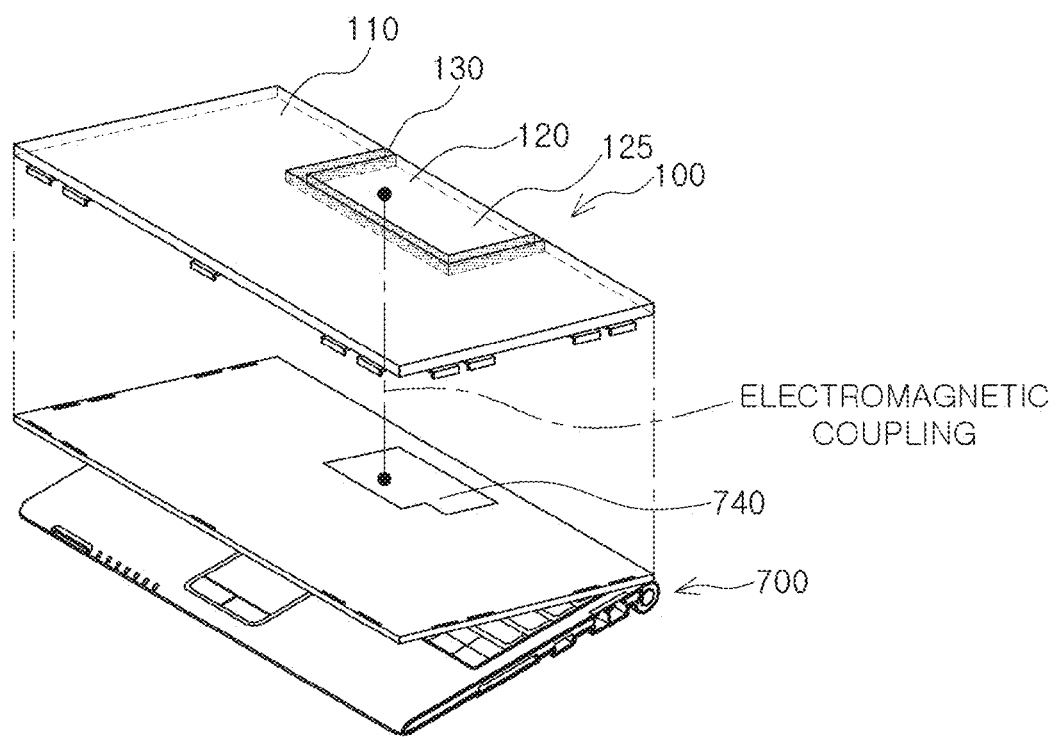

FIGS. 2 through 4 are views illustrating configurations of a cover for an electronic device according to an exemplary embodiment in the present disclosure, Referring to FIG. 2, it can be seen that a cover 100 for an electronic device according to an exemplary embodiment of the present disclosure is used as a rear cover of a portable terminal. The cover 100 for an electronic device may be coupled to a main body 500 of the portable terminal.

The cover 100 for an electronic device may include a first metal region 110 and a second metal region 120 electrically separated by an electrical open path 130, and the second metal region 120 may include an antenna radiation part 125. Also, the cover 100 for an electronic device may include a through-hole 150 for a first camera, a through-hole for a camera flash, a through-hole for a speaker, and the like.

The main body 500 of the portable terminal may include an internal cover 510, a camera unit 520, a battery 530, and an internal camera 540.

The antenna radiation part 125 of the cover 100 for an electronic device may form an electrical connection or electromagnetic coupling with the internal antenna 540 of the main body 500 of the portable terminal. In this case, if the main body 500 of the portable terminal does not include the internal antenna 540, a connection unit or a coupling unit may be disposed instead of the internal antenna. In this case, the antenna radiation part 125 may be electrically coupled to an electric circuit unit through the connection unit or the coupling unit.

Also, in a case in which the antenna radiation part 125 is electrically coupled to the internal antenna 540 of the main body 500 of the portable terminal to feed power to the antenna radiation part 125, resonance, corresponding to the length of an electric conductor, may be formed by inductance according to a current flow in the antenna radiation part 125 and capacitance due to electronic coupling between the antenna radiation part 125 and the internal antenna 540 of the main body 500 of the portable terminal. Antenna performance such as a gain, a bandwidth, and radiation characteristics, and the like, may be enhanced using a resonance frequency. These components may be applied to each exemplary embodiment of the present disclosure.

Referring to FIG. 3, it can be seen that the cover for an electronic device may be used as an upper cover of a set-top box (STB).

Referring to FIG. 3, the cover 100 for an electronic device according to an exemplary embodiment of the present disclosure is used as an upper cover of an STB. The cover 100 for an electronic device may be coupled to a main body 600 of the STB.

The cover 100 for an electronic device may include a first metal region 110 and a second metal region 120 electrically separated by an electrical open path 130, and the second metal region 120 may include an antenna radiation part 125.

The main body 600 of the STB may include an electric circuit board equipped with an internal antenna 640 and an electric circuit unit.

Here, the antenna radiation part 125 of the cover 100 for an electronic device may form an electrical connection or electronic coupling with the internal antenna 640 of the main body 600 of the STB. If the main body 600 of the STB does not include the internal antenna 640, a connection unit or a coupling unit may be disposed instead of an internal antenna. In this case, the antenna radiation part 125 may be electrically coupled to the electric circuit unit through the connection unit and the coupling unit.

Referring to FIG. 4, it can be seen that a cover for an electronic device according to an exemplary embodiment of the present disclosure is used as an upper cover of a notebook computer.

Referring to FIG. 4, the cover 100 for an electronic device according to an exemplary embodiment of the present disclosure may be used as an upper cover of a notebook computer. The cover 100 for an electronic device may be coupled to a main body 700 of the notebook computer.

The cover 100 for an electronic device may include a first metal region 110 and a second metal region 120 electrically separated by an electrical open path 130, and the second metal region 120 may include an antenna radiation part 125.

The main body 700 of the notebook computer may include an electric circuit board equipped with an internal antenna 740 and an electric circuit unit.

Here, the antenna radiation part 125 of the cover 100 for an electronic device may form an electrical connection or electronic coupling with the internal antenna 740 of the main body 700 of the notebook computer. If the main body 700 of the notebook computer does not include the internal antenna 740, a connection unit or a coupling unit may be disposed instead of an internal antenna. In this case, the antenna radiation part 125 may be electrically coupled to the electric circuit unit through the connection unit and the coupling unit.

Figure 5A:
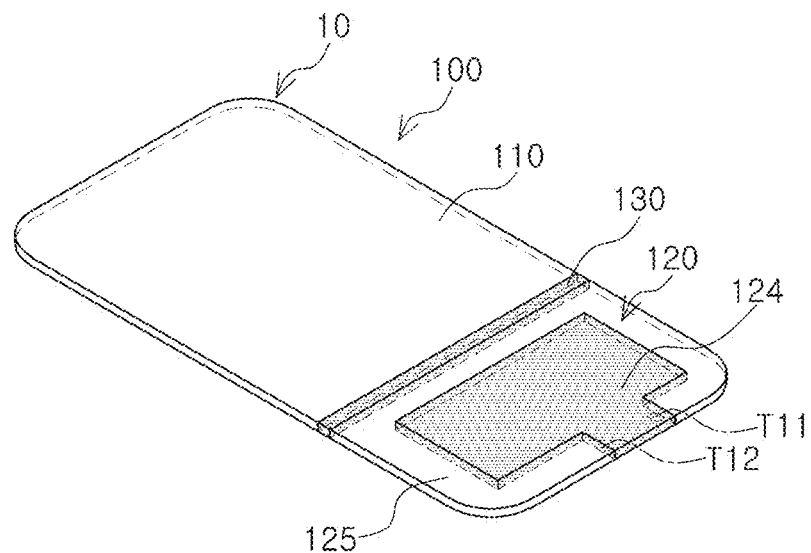
FIGS. 5A through 5B include perspective views of a cover for an electronic device according to an exemplary embodiment in the present disclosure, wherein (a) illustrates an antenna pattern and (b) illustrates another antenna pattern.
Figure 5B:
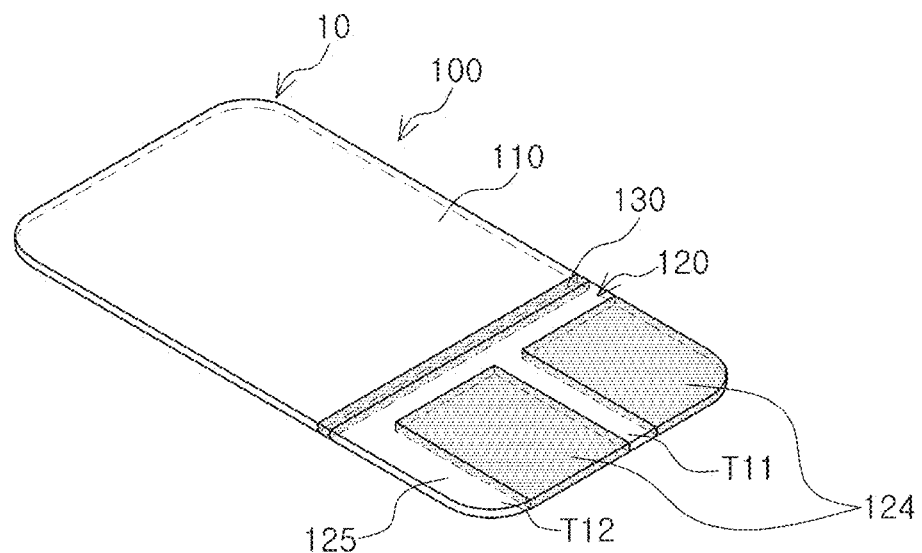

FIGS. 5A and 5B include perspective views implementing a cover for an electronic device according to an exemplary embodiment in the present disclosure, wherein FIG. 5A illustrates an antenna pattern and FIG. 5B illustrates another antenna pattern.

Referring to FIGS. 5A and 5B, as mentioned above, the antenna radiation part 125 may act as an antenna as the second metal region 120 is itself electrically coupled or electromagnetically coupled to an electric circuit unit or an internal antenna inside an electronic device.

In contrast, as illustrated in FIGS. 5A and 5B, the antenna radiation part 125 may have a particular antenna pattern. For example, a portion of the second metal region 120 may be demetallized through metal oxidation, and a metal region that remains without being oxidized, over the oxidized partial region 124, may form an antenna pattern.

As illustrated in FIG. 5A, the antenna pattern may have a loop shape formed along the edges, or as illustrated in FIG. 5B, the antenna pattern may have an inverted F shape. In addition, the antenna pattern may have a spiral shape. The antenna pattern may have various other shapes, without being particularly limited.

As mentioned above, the antenna radiation part 125 may act as an antenna through electrical connection or electromagnetic coupling with an electric circuit unit or an internal antenna inside an electronic device. Examples thereof will be described with reference to FIGS. 6 and 7.

Figure 6:
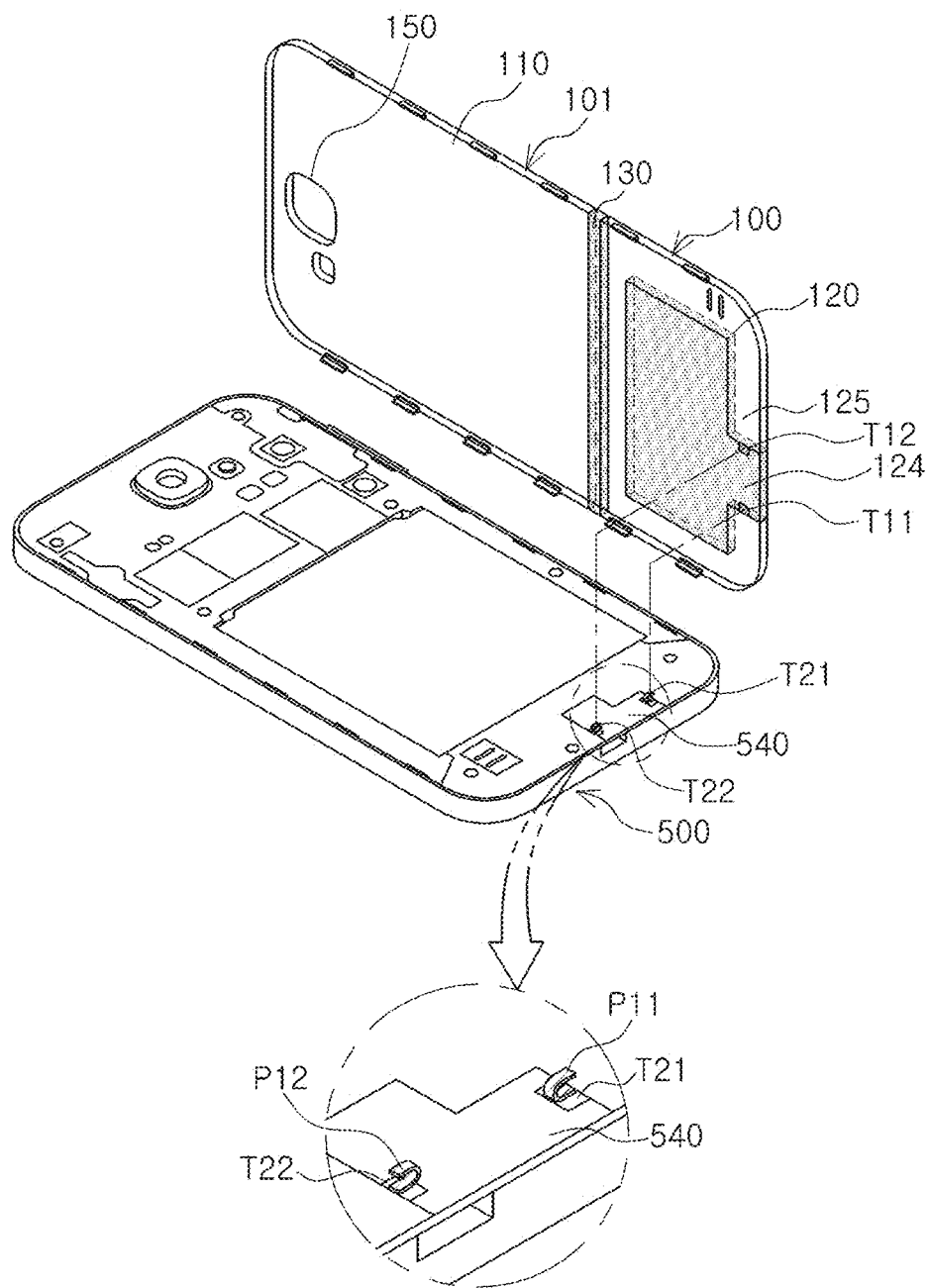
FIGS. 6 and 7 are views illustrating coupling of a cover for an electronic device according to an exemplary embodiment in the present disclosure.
Figure 7:
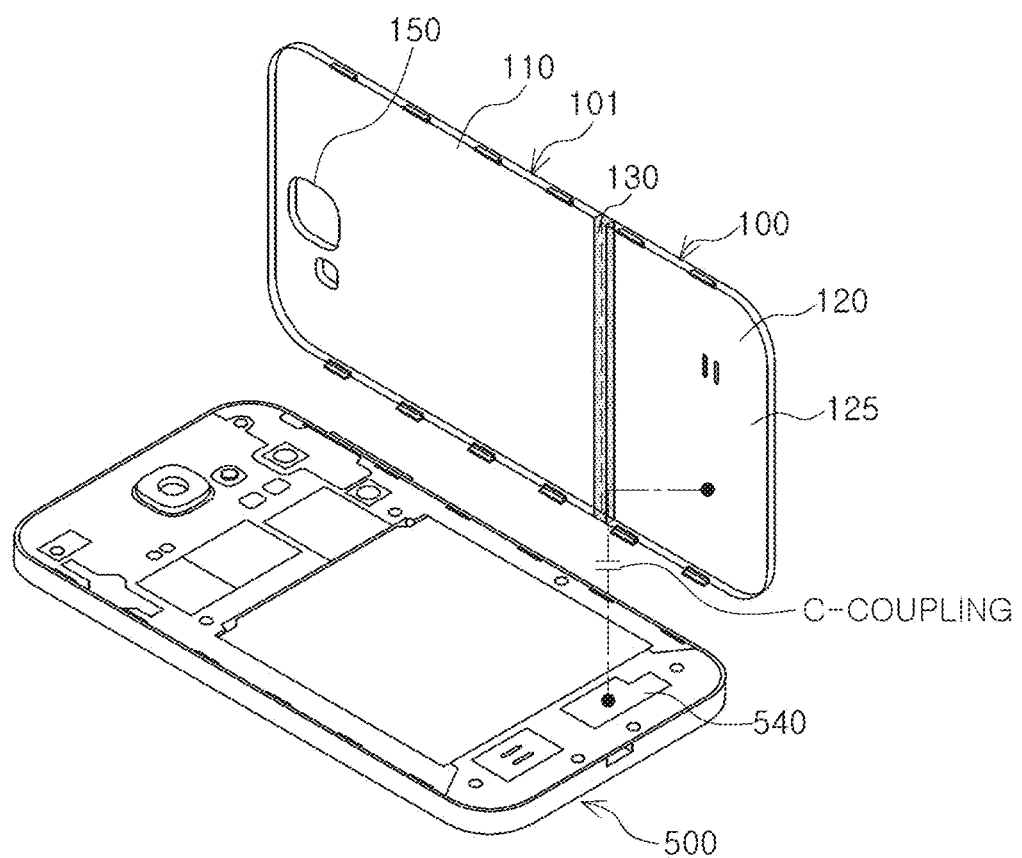

FIGS. 6 and 7 are views illustrating coupling of a cover for an electronic device according to an exemplary embodiment in the present disclosure.

Referring to FIG. 6, for example, the antenna radiation part 125 is electrically coupled to an internal antenna 540 of an electronic device. When the cover 100 for an electronic device is fastened to be coupled to the main body 500 of the portable terminal as an electronic device, connection portions T11 and T12 of an antenna pattern of the antenna radiation part 125 may be in direct contact with elastic connection pins P11 and P12 formed on connection portions T21 and T22 of the internal antenna 540 of the main body 500 of the portable terminal so as to be electrically coupled. This is an example of an electrical connection and the present disclosure is not limited thereto.

Referring to FIG. 7, for example, the antenna radiation part 125 is electromagnetically coupled to the internal antenna 540 of an electronic device. When the cover 100 for an electronic device is fastened to be coupled to the main body 500 of the portable terminal, the antenna radiation part 125 may be electromagnetically coupled (C coupling) to the internal antenna 540 of the main body 500 of the portable terminal.

In this case, capacitance C may be formed between the antenna radiation part 125 and the internal antenna 540 of the main body 500 of the portable terminal.

Figure 8:
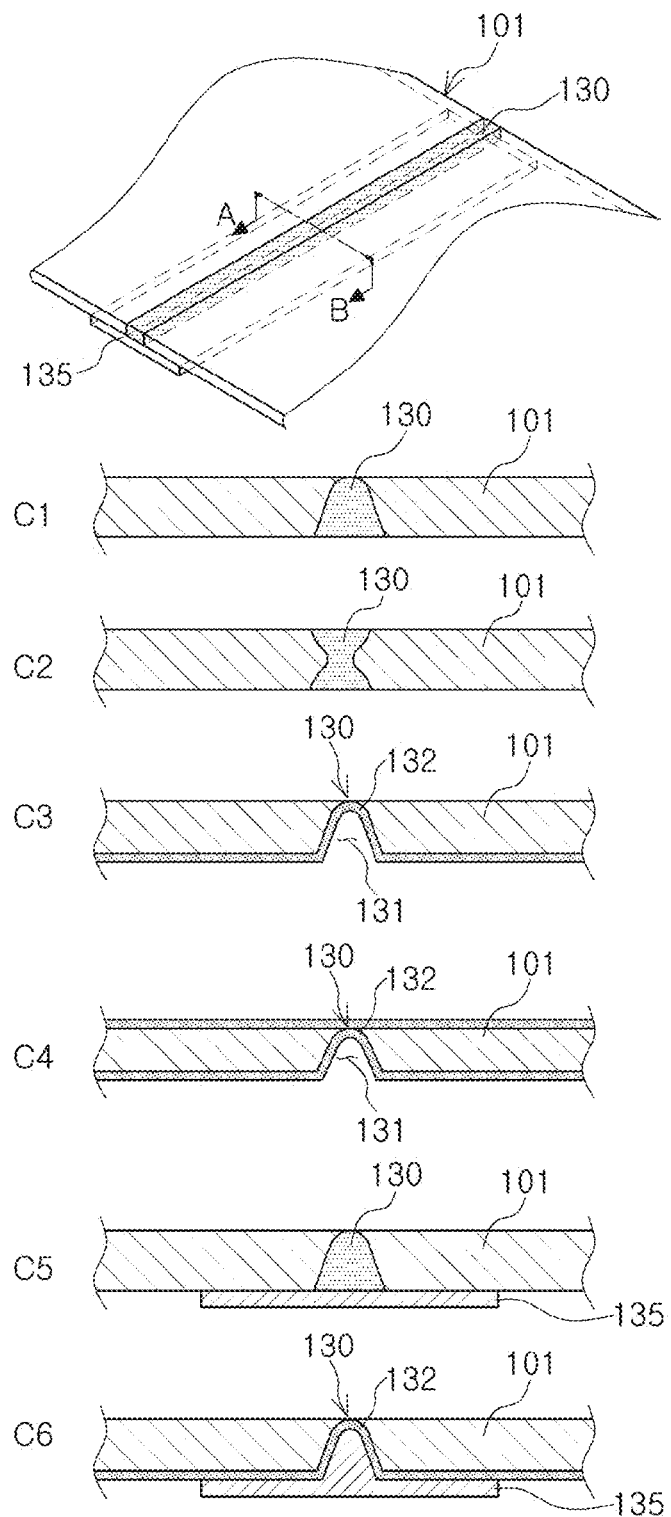
FIG. 8 is a view illustrating an electrical open path of a cover for an electronic device according to an exemplary embodiment of the present disclosure.

FIG. 8 is a view illustrating an electrical open path of a cover for an electronic device according to an exemplary embodiment in the present disclosure.

Referring to FIG. 8, the electrical open path 130 may have various structures such as a case 1 C1, a case 2 C2, a case 3 C3, and a case 4 C4.

For example, referring to a cross-sectional structure taken along line A-B of the metal plate 101, case 1 C1 shows a cross-sectional structure of an electrical open path 130 formed by performing metal oxidation in a state in which a lower surface of the metal plate 101 is masked with a masking material, with only a region to be oxidized left unmasked (that is, except for only a region to be oxidized). In an exemplary embodiment of the present disclosure, the masking material may be a masking film, a masking jig, or the like, serving to prevent a surface of the metal plate 101 from being oxidized through metal oxidation, but the present disclosure is not particularly limited to a masking material or a masking method.

Case 2 C2 shows a cross-sectional structure of an electrical open path 130 formed by performing metal oxidation in a state in which upper and lower surfaces of the metal plate 101 are masked with a masking material, respectively, with only regions to be oxidized left unmasked (that is, except for only regions to be oxidized).

Case 3 C3 shows a cross-sectional structure of an electrical open path 130 formed by performing metal oxidation on a lower surface of the metal plate 101, without masking, in a state in which a concave recess 131 is formed on a lower surface of the metal plate 101.

Case 4 C4 shows a cross-sectional structure of an electrical open path 130 formed by performing metal oxidation on both upper and lower surfaces of the metal plate 101, without masking, in a state in which a concave recess 131 is formed on a lower surface of the metal plate 101 and unmasked.

In case 5 C5, a non-metallic member 135 may be disposed on the metal plate 101 of case 1 C1 to cover at least the electrical open path 130.

In case 6 C6, a non-metallic member 135 may be disposed on the metal plate 101 of case 3 C3 to cover at least the electrical open path 130.

So far, the structures of the electrical open path 130 have been described by taking case 1 to case 4 as examples, but the present disclosure is not limited thereto.

In the metal plate 101, the portion where the electrical open path 130 is formed may weaken, and thus, in order to reinforce strength thereof, the non-metallic member 135 may be disposed on the metal plate 101. The non-metallic member 135 may be disposed in each of case 1 to case 4, and this will be described with case 5 and case 6, for example.

A separately manufactured non-metallic member 135 may be attached to the metal plate 101 or the non-metallic member 135 may be formed on the metal plate 101 through insert injection or outsert injection. Here, the arrangement of the non-metallic member 135 on the metal plate 101 is not limited to the foregoing examples.

For example, the electrical open path 130 should not have a metal component from a lower surface of the metal plate 101 to an upper surface thereof. For example, the electrical open path 130 should be demetallized to have an electrically infinite impedance. Thus, any method may be employed as long as it can oxidize the metal region of the metal plate 101 corresponding to the electrical open path 130 such that the metal region does not have any metal component from an upper surface and a lower surface thereof to thus have an infinite impedance, in consideration of a thickness of the metal plate 101, a metal oxidation time, a thickness of a metal region that may be demetallized through metal oxidation, and the like.

Here, the concave recess 131 may be formed on an inner surface of the metal cover such that it is not exposed outwardly when the metal cover is fastened to an electronic device. In an exemplary embodiment of the present disclosure, a cross-sectional structure of the electrical open path 130 as illustrated in FIG. 8 or a cross-sectional structure of an electrical open region as described hereinafter are proposed as a portion of various examples, without intending to limit sizes and shapes thereof.

For example, in a case in which a thickness equal to 0.7 mm can be oxidized through an employed metal oxidation, if a thickness of the metal cover 100 is approximately 0.6 mm, an electrical open path may be sufficiently formed even without having to form a concave recess by oxidizing a metal having a thickness equal to 0.7 mm through metal oxidation.

In another example, in a case in which a thickness equal to 0.3 mm can be oxidized through an employed metal oxidation, if a thickness of the metal cover 100 is approximately 0.9 mm, a concave recess having a thickness equal to 0.7 mm may be formed and the remaining metal having a thickness equal to 0.2 mm may be subsequently oxidized through metal oxidation to sufficiently form an electrical open path.

Referring to FIG. 8, the electrical open path 130 may include only the metal oxide layer like in case 1 C1 and case 2 C2 as described above.

The electrical open path 130 may also include the concave recess 131 and a metal oxide layer 132 such as in case 3 C3 and case 4 C4 as described above.

Here, the concave recess 131 may concavely be formed along the boundary between the first metal region 110 and the second metal region 120.

The metal oxide layer 132 is a non-metallic ceramic layer formed by demetallizing the metal from an inner lower surface of the concave recess 131 to the other surface of the opposite side through metal oxidation.

Figure 9:
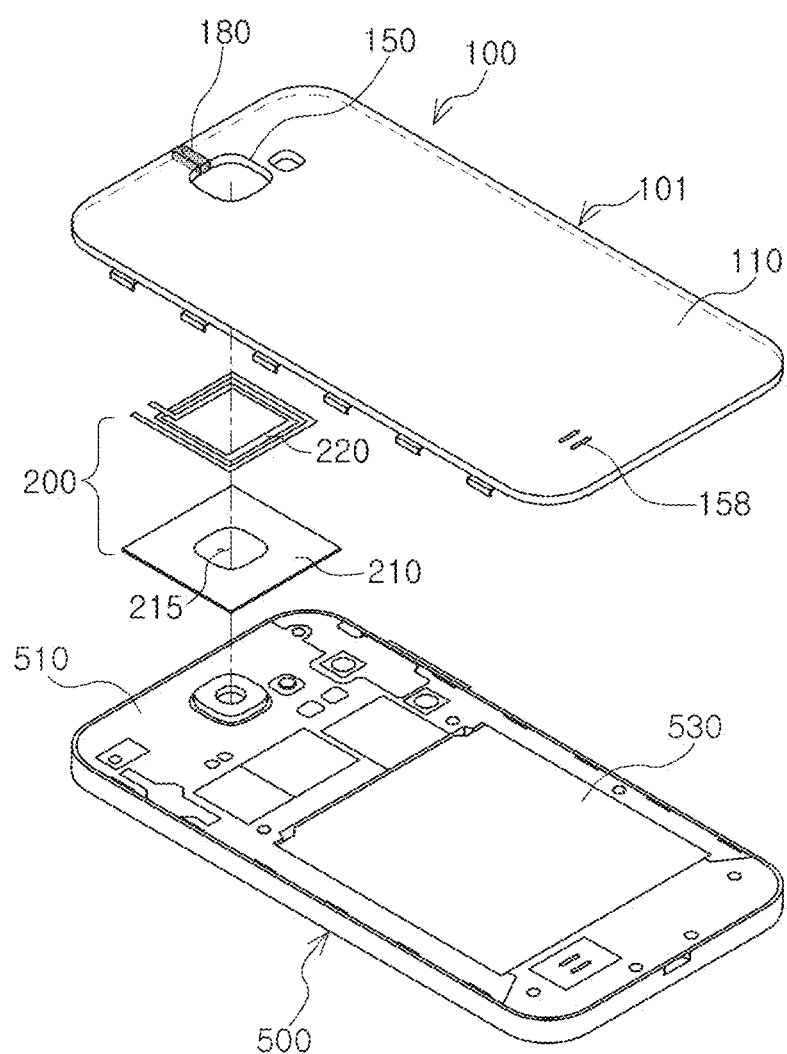
FIGS. 9 and 10 are exploded perspective views of an antenna assembly according to an exemplary embodiment in the present disclosure.
Figure 10:
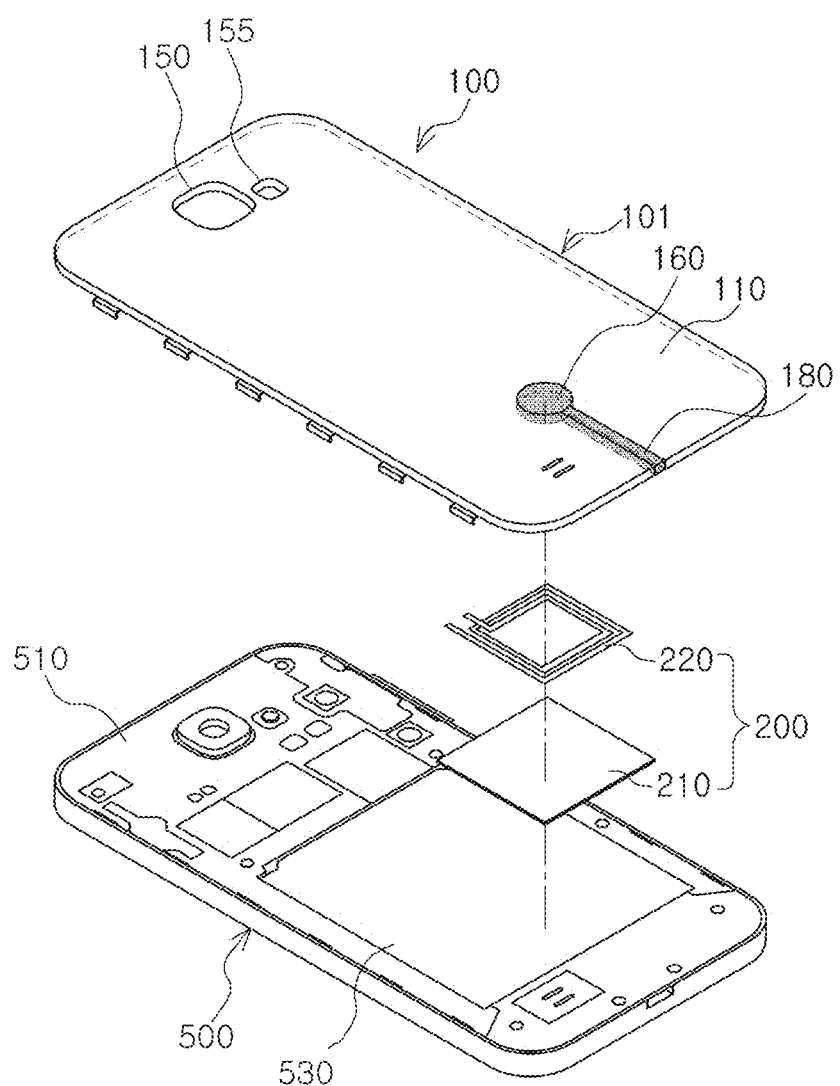
Figure 11A:
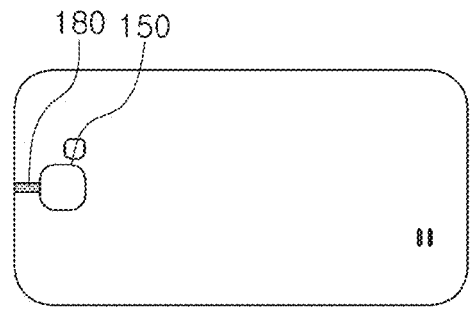
FIGS. 11A though 11D and 12A though 12D are views illustrating various electrical open paths according to an exemplary embodiment in the present disclosure.
Figure 11B:
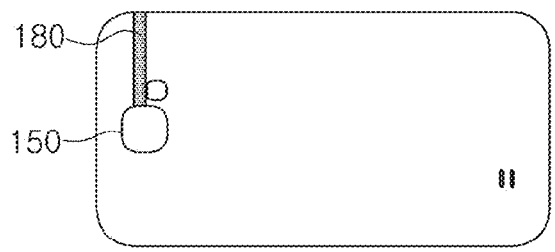
Figure 11C:
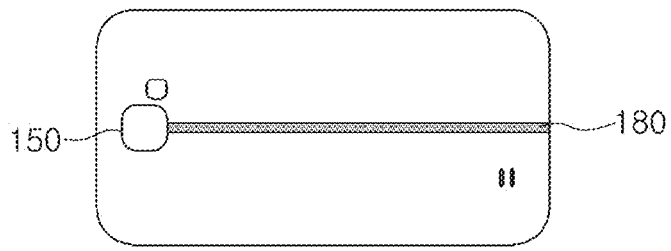
Figure 11D:
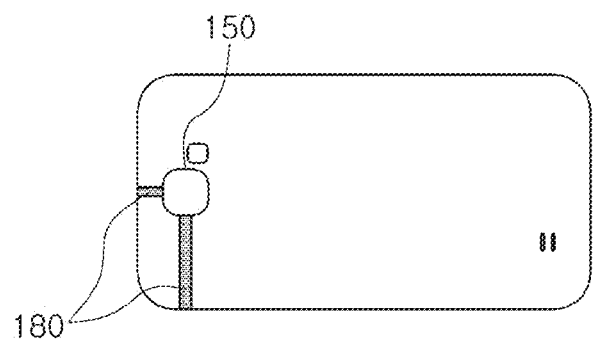
Figure 12A:
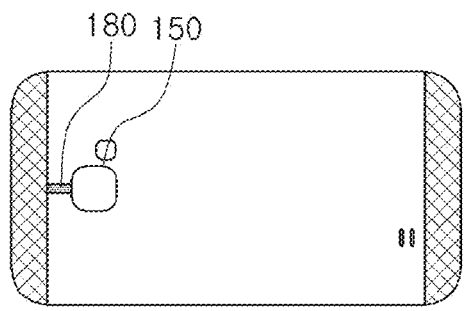
Figure 12B:
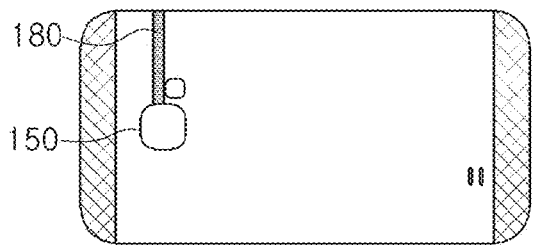
Figure 12C:
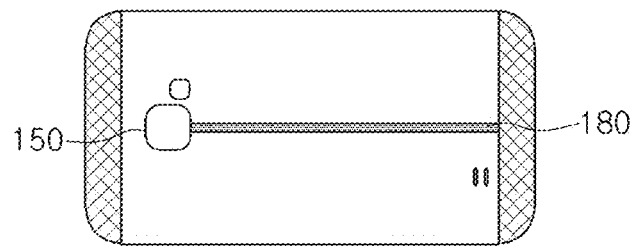
Figure 12D:
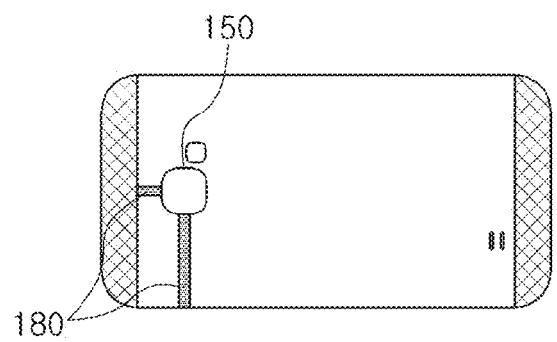

FIGS. 9 and 10 are exploded perspective views of an antenna assembly according to an exemplary embodiment of the present disclosure.

Referring to FIGS. 9 and 10, an antenna assembly according to an exemplary embodiment of the present disclosure may include a cover 100 for an electronic device and an antenna module 200.

The cover 100 for an electronic device may be disposed inside or outside of an electronic device. For example, the cover 100 for an electronic device may be an external cover of an electronic device or an internal cover of an electronic device. In an exemplary embodiment of the present disclosure, for example, although the cover 100 for an electronic device is described as an external cover, the present disclosure is not limited thereto.

For example, the antenna module 200 may include an antenna sheet 210 and an antenna pattern coil 220 formed on the antenna sheet 210. Here, the antenna sheet 210 may include a magnetic material such as ferrite in order to attenuate an eddy current and increase current concentration of the antenna pattern coil 220. The antenna pattern coil 220 may have a loop shape or a spiral shape formed along the edges of the antenna sheet 210, and the present disclosure is not limited thereto.

The antenna module 200 may be disposed inside of the cover 100 for an electronic device. For example, the antenna module 200 may be disposed on an inner surface of the cover 100 for an electronic device, may be disposed on the internal cover 510 of the portable terminal 500 as an electronic device, or may be disposed on the battery 530.

The antenna module 200 may be disposed in any position as long as it is electrically coupled to an electric circuit unit of the main body 500 of the portable terminal and is electromagnetically coupled to the cover 100 for an electronic device, without being particularly limited.

However, for example, in a case in which the antenna module 200 is applied as an antenna for near-field communication (NFC), the antenna module 200 may be disposed in a position where electromagnetic waves may enter and exit through a portion of the cover 100 for an electronic device. This will be described with reference to FIGS. 9 and 10.

First, referring to FIG. 9, the cover 100 for an electronic device may include a metal plate 101, through-holes (e.g., 150, 155, and 158), and an electrical open path 180.

At least a portion of the metal plate 101 may be formed of a metal, and the metal plate 101 may include a first metal region 110 formed of a metal.

For example, at least a portion of the metal plate 101 may be formed of a metal, and the entirety of the metal plate 101 may be formed of a metal or a portion of the metal plate 101 may be formed of a metal.

Here, the metal according to an exemplary embodiment of the present disclosure may be formed by a least one of deposition, plating, and painting processes.

The through-hole may be formed in a portion of the first metal region 110 of the metal plate 101 to allow spatial electromagnetic waves to enter and exit therethrough. Here, in a case in which the through-hole 150 corresponds to a central position of the antenna sheet 210, a penetration hole providing a camera shooting path may be formed at a central position of the antenna sheet 210.

In an exemplary embodiment of the present disclosure, the through-hole 150 may be formed by removing a metal from an upper surface to a lower surface of the metal plate 101. The through-hole 150 may be filled with a nonmetal such as plastic, or the like. In an exemplary embodiment of the present disclosure, at least the through-hole refers to an open region having electrically infinite impedance.

For example, in a case in which the antenna module 200 is used for a low frequency (e.g., 13.56 MHz) as a short wave frequency like an NFC antenna, a hole such as a through-hole corresponding to an electrically open region is required, and an arrangement of the antenna module 200 in the vicinity of the through-hole may increase antenna efficiency.

The electrical open path 180 may be a portion formed by demetallizing the metal from the through-hole 150 to an end portion on one side of the first metal region 110 through metal oxidation. The electrical open path 180 may change an electromagnetic wave path (e.g., an eddy current) in the first metal region 110.

For example, when the antenna module 200 is disposed in the vicinity of the through-hole 150, entry and exit of an electromagnetic wave may be allowed. However, since the cover 100 for an electronic device is metal, a repulsive magnetic field according to Lenz's law may be generated in the cover 100 for an electronic device, forming an eddy current in the cover 100 for an electronic device in a direction opposite a direction of a current flowing in the antenna module 200, and the eddy current may interfere with the current flow in the antenna module 200 to degrade antenna performance.

Here, since the electrical open path 180 changes the path of the eddy current, influence of the eddy current on the current flow in the antenna module 200 may be reduced and, since the eddy current is distributed to the entire range of the cover 100 for an electronic device, an antenna recognition distance may be resultantly increased.

Referring to FIG. 10, a cover 100 for an electronic device may include a metal plate 101, an electrical open region 160, and an electrical open path 180.

Here, compared to the metal plate 101 illustrated in FIG. 9, the metal plate 101 has the electrical open region 160, and the difference of the metal plate 101 from that of FIG. 9 will largely be described.

The electrical open region 160 may be a nonmetal region formed by demetallizing a portion of the first meal region 110 of the metal plate 101 through metal oxidation, allowing spatial electromagnetic waves to enter and exit therethrough.

Here, the electrical open region 160 may be a ceramic region formed by oxidizing a metal through metal oxidation. The electrical open region 160 may allow spatial electromagnetic waves to enter and exit therethrough, like the through-hole 150.

For example, in the portable terminal 500 employing the antenna assembly, if it is not proper or not easy to arrange the antenna module 200 in the vicinity of the through-hole 150, the electrical open region 160 may be used to allow for the entry and exit of spatial electromagnetic waves. When the electrical open region 160 is used, an arrangement of the antenna module 200 may be freely determined regardless of through-hole.

As mentioned above, the electrical open path 180 is also a non-metal path formed by demetallizing the metal from the electrical open region 160 to an end portion on one side of the first metal region 110 through metal oxidation, changing a path of electromagnetic waves generated by the antenna module 200.

For example, when the antenna module 200 is disposed in the vicinity of the electrical open region 160, the entry and exit of electromagnetic waves may be allowed. However, since the cover 100 for an electronic device is metal, as mentioned above, a repulsive magnetic field according to Lenz's law may be generated in the cover 100 for an electronic device, forming an eddy current in the cover 100 for an electronic device in a direction opposite a direction of a current flowing in the antenna module 200, and the eddy current may interfere with the current flow in the antenna module 200 to degrade antenna performance.

Here, since the electrical open path 180 changes the path of the eddy current, influence of the eddy current on the current flow in the antenna module 200 may be reduced and, since the eddy current is distributed to the entire range of the cover 100 for an electronic device, an antenna recognition distance may be increased resultantly.

FIGS. 11A-11D and 12A-12D are views illustrating various electrical open paths according to an exemplary embodiment in the present disclosure.

Referring to case 1 to case 4 (C1 to C4) illustrated in FIGS. 11A-11D, it can be seen that, in the cover 100 for an electronic device entirely formed of a metal, the electrical open path 180 may be formed to extend from the through-hole 150 in various directions, and a single or a plurality of electrical open paths 180 may be formed.

Referring to case 1 to case 4 (C1 to C4) illustrated in FIGS. 12A-12D, it can be seen that, in the cover 100 for an electronic device in which both end portions are formed of a non-metallic material such as plastic and other portions are formed of a metal, the electrical open path 180 may be formed to extend from the through-hole 150 in various directions, and a single or a plurality of electrical open paths 180 may be formed.

Figure 13:
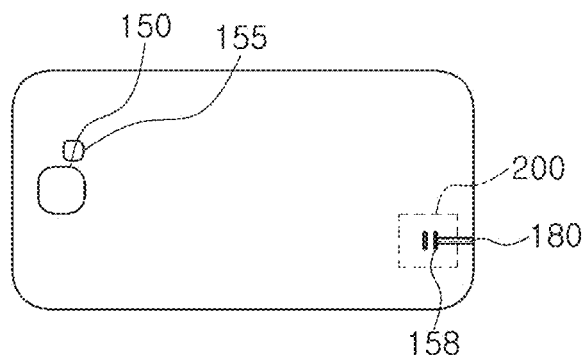
FIGS. 13 and 14 are views illustrating a through-hole and an electrical open path according to an exemplary embodiment in the present disclosure.
Figure 14:
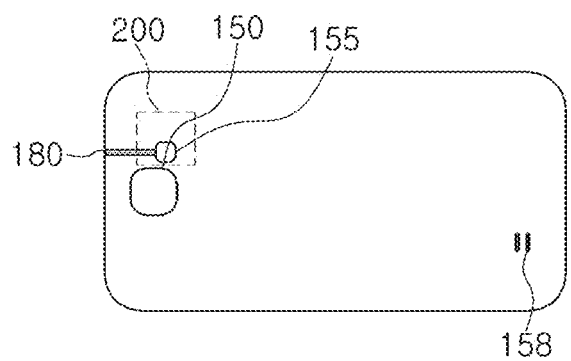

FIGS. 13 and 14 are views illustrating a through-hole and an electrical open path according to an exemplary embodiment in the present disclosure.

Referring to FIGS. 11 through 14, the through-hole is a hole formed in the cover 100 for an electronic device. Any hole may be used sufficiently as long as it can allow for entry and exit of spatial electromagnetic waves. For example, the through-hole may be a hole 150 for a camera, a hole 155 for a flash light, or a hole 158 for a speaker. Or, the through-hole may be any other particular hole.

FIGS. 11A-11D and 12A-12D show the hole 150 for a camera, as a through-hole, FIG. 13 shows the hole 155 for a flash light, as a through-hole, and FIG. 14 shows the hole 158 for a speaker, as a through-hole.

Here, although the hole 150 for a camera will be described as an example of a through-hole in an exemplary embodiment of the present disclosure, but it is merely illustrative and the present disclosure is not limited thereto.

Figure 15:
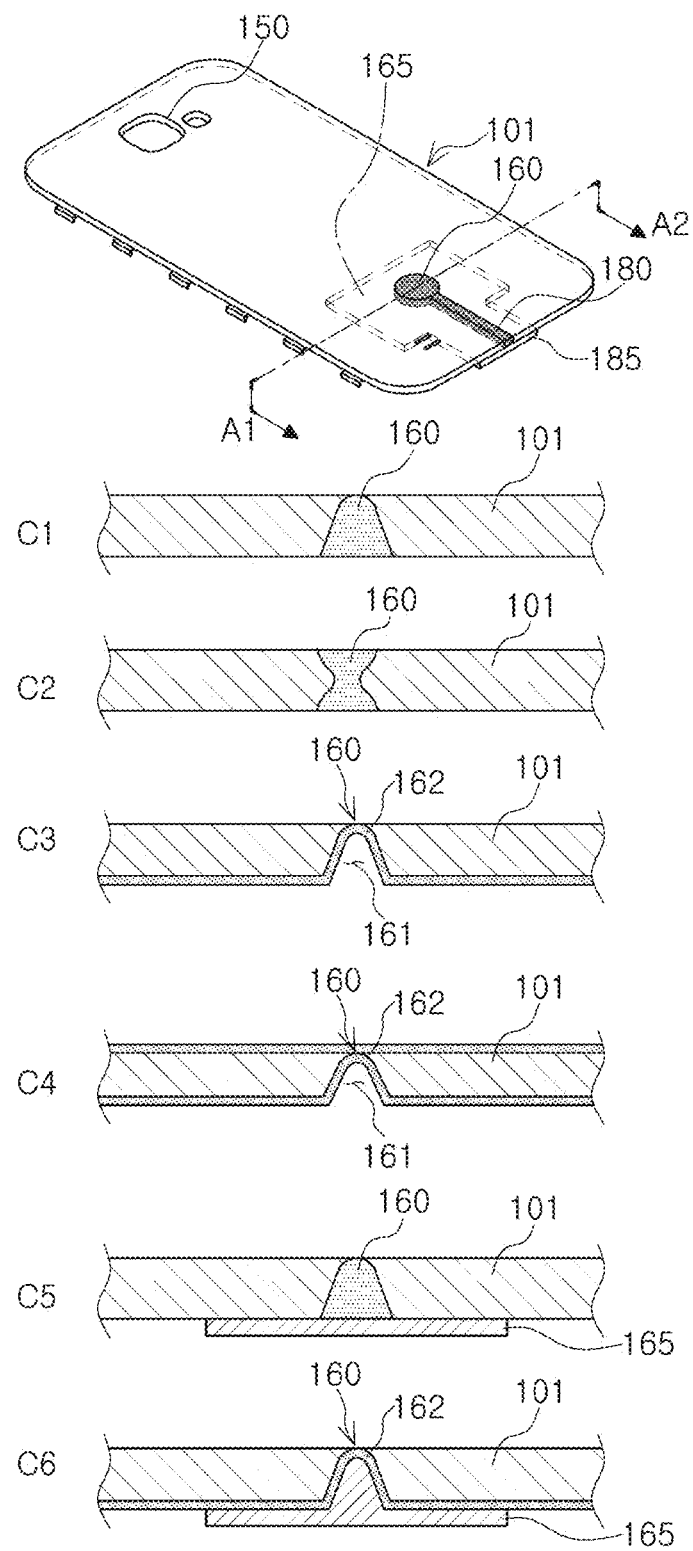
FIGS. 15 and 16 are views illustrating electrical open regions according to an exemplary embodiment in the present disclosure.
Figure 16:
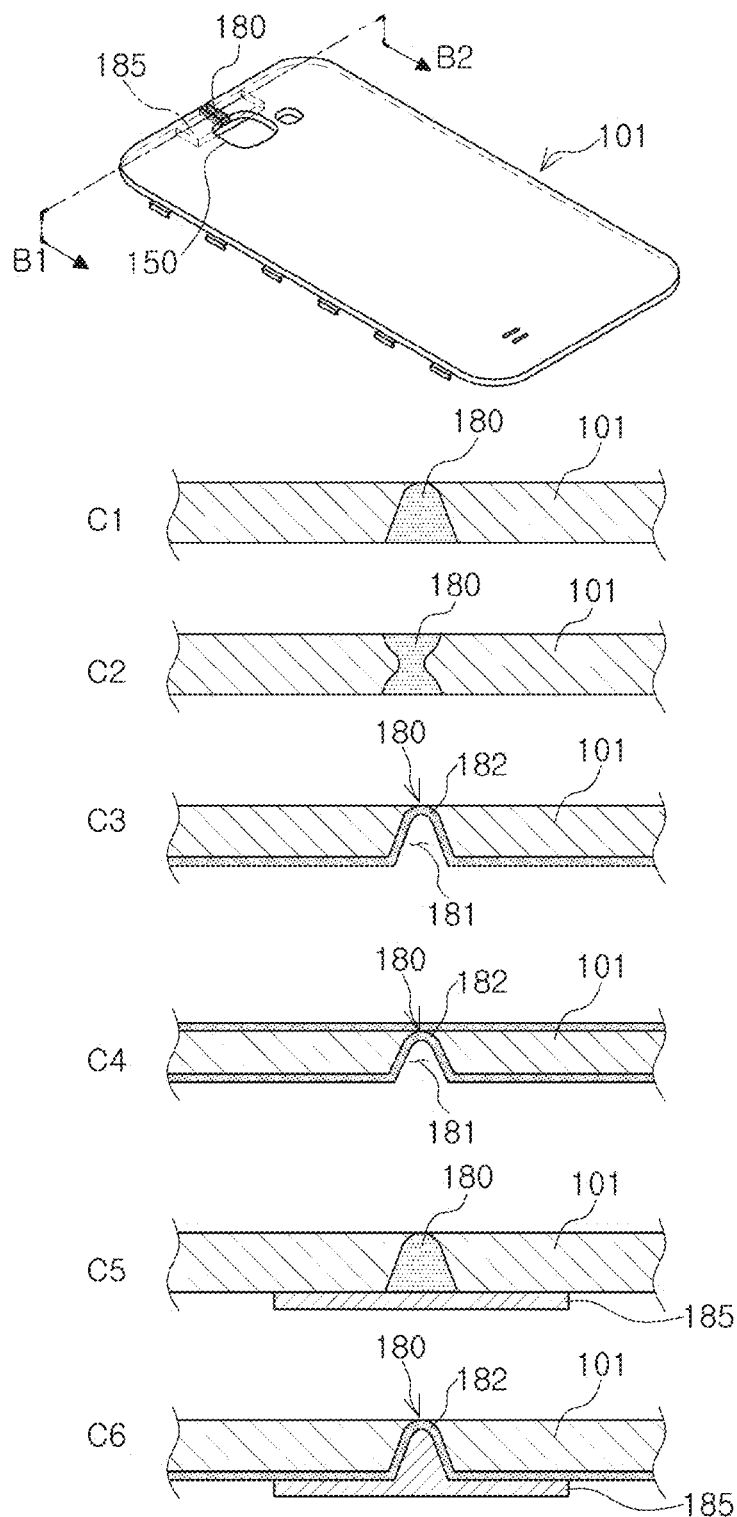

FIGS. 15 and 16 are views illustrating electrical open regions according to an exemplary embodiment in the present disclosure.

Referring to FIG. 15, an electrical open region 160 may have various structures such as a case 1 C1, a case C2, a case 3 C3, and a case 4 C4.

For example, referring to a cross-sectional structure taken along line A1-A2 of the metal plate 101, case 1 C1 shows a cross-sectional structure of an electrical open region 160 formed by performing metal oxidation in a state in which a lower surface of the metal plate 101 is masked with a masking material, with only a region to be oxidized left unmasked (that is, except for only a region to be oxidized).

Case 2 C2 shows a cross-sectional structure of an electrical open region 160 formed by performing metal oxidation in a state in which upper and lower surfaces of the metal plate 101 are masked with a masking material, respectively, with only regions to be oxidized left unmasked (that is, except for only regions to be oxidized).

Case 3 C3 shows a cross-sectional structure of an electrical open region 160 formed by performing metal oxidation on a lower surface of the metal plate 101, without masking, in a state in which a concave recess 161 is formed on a lower surface of the metal plate 101.

Case 4 C4 shows a cross-sectional structure of an electrical open region 160 formed by performing metal oxidation on both upper and lower surfaces of the metal plate 101, without masking, in a state in which a concave recess 131 is formed on a lower surface of the metal plate 101 and unmasked.

In case 5 C5, a non-metallic member 165 may be disposed on the metal plate 101 of case 1 C1 to cover at least the electrical open region 160.

In case 6 C6, a non-metallic member 165 may be disposed on the metal plate 101 of case 3 C3 to cover at least the electrical open region 160.

So far, the structures of the electrical open region 130 have been described by taking the four cases as examples, but the present disclosure is not limited thereto.

In the metal plate 101, the portion where the electrical open region 160 is formed may weaken, and thus, in order to reinforce strength thereof, the non-metallic member 165 may be disposed on the metal plate 101. The non-metallic member 165 may be disposed in each of case 1 to case 4, and this will be described with case 5 and case 6, for example.

A separately manufactured non-metallic member 165 may be attached to the metal plate 101 or the non-metallic member 165 may be formed on the metal plate 101 through insert injection or outsert injection. Here, the arrangement of the non-metallic member 165 on the metal plate 101 is not limited to the foregoing examples.

Here, the concave recess 161 may be formed on an inner surface of the metal cover such that it is not exposed outwardly when the metal cover is fastened to an electronic device. Here, a lower surface of the metal plate may correspond to the inner surface, and an upper surface of the metal plate may correspond to an outwardly exposed surface.

Also, as illustrated in FIG. 15, when both the electrical open region 160 and the electrical open path 180 are formed on the metal plate 101, the non-metallic member 165 may be disposed on the metal plate 101 to cover the electrical open region 160 and the electrical open path 180. Also, in order to reinforce strength by a higher degree, the non-metallic members 165 and 185 may be disposed on the metal plate 101 to cover both the at least electrical open region 160 and the electrical open path 180.

Here, the non-metallic member 165 disposed to cover the electrical open path 160 and the non-metallic member 185 disposed to cover the electrical open path 180 may be separately formed, but in consideration of ease in process, the non-metallic member 165 and the non-metallic member 185 may be integrally formed.

Referring to FIG. 15, the electrical open region 160 may include only the metal oxide layer like in case 1 C1 and case 2 C2 as described above.

Or, the electrical open region 160 may include the concave recess 161 and a metal oxide layer 162 like in case 3 C3 and case 4 C4 as described above.

Here, the concave recess 161 may concavely be formed along the boundary between the first metal region 110 and the second metal region 120.

The metal oxide layer 162 is a non-metallic ceramic layer formed by demetallizing the metal from an inner lower surface of the concave recess 161 to the other surface of the opposite side through metal oxidation.

Referring to FIG. 16, the electrical open path 180 may have various structures such as a case 1 C1, a case 2 C2, a case 3 C3, and a case 4 C4.

For example, referring to a cross-sectional structure taken along line B1-B2 of the metal plate 101, case 1 C1 shows a cross-sectional structure of an electrical open path 180 formed by performing metal oxidation in a state in which a lower surface of the metal plate 101 is masked with a masking material, with only a region to be oxidized left unmasked (that is, except for only a region to be oxidized).

Case 2 C2 shows a cross-sectional structure of an electrical open path 180 formed by performing metal oxidation in a state in which upper and lower surfaces of the metal plate 101 are masked with a masking material, respectively, with only regions to be oxidized left unmasked (that is, except for only regions to be oxidized).

Case 3 C3 shows a cross-sectional structure of an electrical open path 180 formed by performing metal oxidation on a lower surface of the metal plate 101, without masking, in a state in which a concave recess 181 is formed on a lower surface of the metal plate 101.

Case 4 C4 shows a cross-sectional structure of an electrical open path 130 formed by performing metal oxidation on both upper and lower surfaces of the metal plate 101, without masking, in a state in which a concave recess 181 is formed on a lower surface of the metal plate 101 and unmasked.

In case 5 C5, a non-metallic member 185 may be disposed on the metal plate 101 of case 1 C1 to cover at least the electrical open path 180.

In case 6 C6, a non-metallic member 185 may be disposed on the metal plate 101 of case 3 C3 to cover at least the electrical open path 180.

So far, the structures of the electrical open region 180 have been described by taking the four cases as examples, but the present disclosure is not limited thereto.

In the metal plate 101, the portion where the electrical open region 160 is formed may weaken, and thus, in order to reinforce strength thereof, the non-metallic member 185 may be disposed on the metal plate 101. The non-metallic member 185 may be disposed in each of case 1 to case 4, and this will be described with case 5 and case 6, for example.

Separately manufactured non-metallic member 135, 165, or 185 may be attached to the metal plate 101 or the non-metallic member 135, 165, or 185 may be formed on the metal plate 101 through insert injection or outsert injection.

Here, the arrangement of the non-metallic member 135, 165, or 185 on the metal plate 101 is not limited to the foregoing examples. The non-metallic member 135, 165, or 185 may be any member as long as it is formed of a nonconductive material such as plastic, film, or the like.

Here, the concave recess 181 may be formed on an inner surface of the metal cover such that it is not exposed outwardly when the metal cover is fastened to an electronic device. Here, a lower surface of the metal plate may correspond to the inner surface, and an upper surface of the metal plate may correspond to an outwardly exposed surface.

Referring to FIG. 16, the electrical open path 180 may include only the metal oxide layer like in case 1 C1 and case 2 C2 as described above.

Or, the electrical open path 180 may include the concave recess 181 and a metal oxide layer 182 such as in case 3 C3 and case 4 C4 as described above.

Here, the concave recess 181 may concavely be formed along the boundary between the first metal region 110 and the second metal region 120.

The metal oxide layer 182 is a non-metallic ceramic layer formed by demetallizing the metal from an inner lower surface of the concave recess 131 to the other surface of the opposite side through metal oxidation.

The antenna assembly as described above may be employed in an electronic device such as a portable terminal. An electronic device according to an exemplary embodiment of the present disclosure may further include a main body including the electric circuit unit electrically coupled to the antenna module 200. Here, the electric circuit unit may be electrically coupled to an internal antenna and may transmit and receive a signal through the antenna module 200. In an exemplary embodiment of the present disclosure, a connection terminal of the electric circuit unit and a connection terminal of the antenna module 200 may be electrically coupled. In this case, the electrical connection is not particularly limited to a particular scheme and a general electrical connection scheme between two circuit modules may be employed.

For example, in a case in which the antenna module 200 is an NFC antenna, the electric circuit unit may include an NFC transceiver.

Figure 17A:
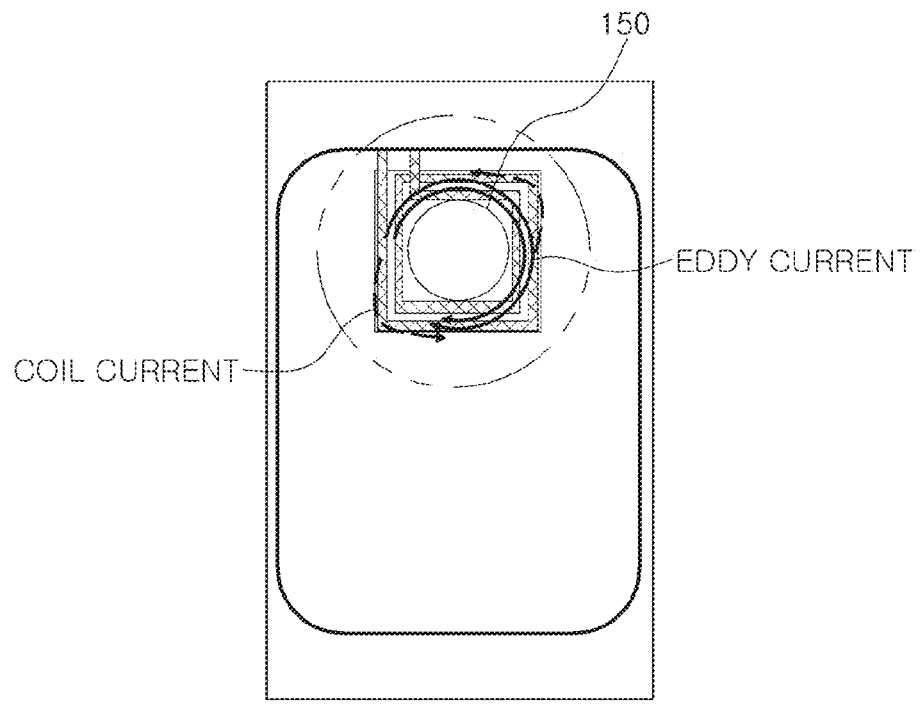
FIGS. 17A through 17B include views illustrating a comparison between a coil current and an eddy current according to the presence and absence of an electrical open path according to an exemplary embodiment in the present disclosure.
Figure 17B:
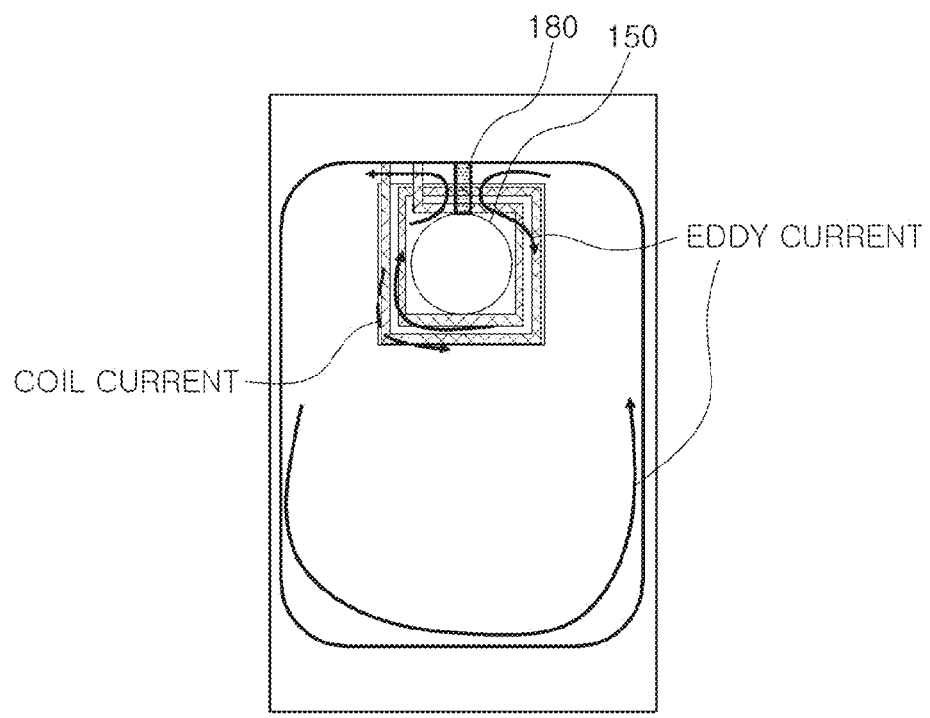

FIGS. 17A and 17B are views illustrating a comparison between a coil current and an eddy current according to the presence and absence of an electrical open path according to an exemplary embodiment of the present disclosure. FIG. 17A, shows flows of a coil current and an eddy current generated by the antenna module 200 when the electrical open path 180 is not provided, and FIG. 17B shows a coil current and an eddy current generated by the antenna module 200 when the electrical open path 180 is present.

Referring to (FIG. 17A, it can be seen that, without the electrical open path 180, the coil current and the eddy current flow in the mutually opposite directions, and referring to FIG. 17B, it can be seen that, with the electrical open path 180, the path of the eddy current is changed.

Figure 18A:
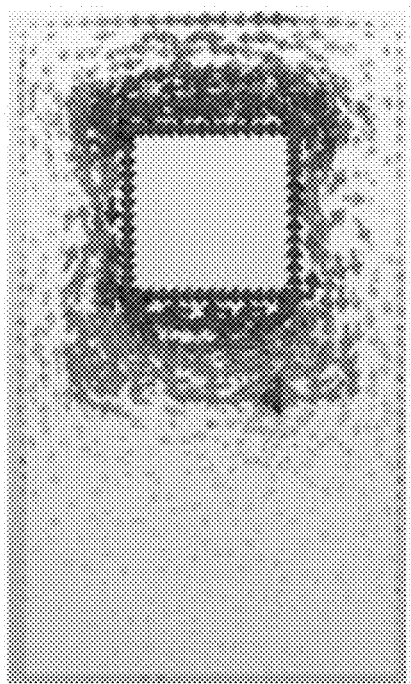
FIGS. 18A through 18B include views illustrating a comparison between current distributions according to the presence and absence of an electrical open path according to an exemplary embodiment in the present disclosure.
Figure 18B:
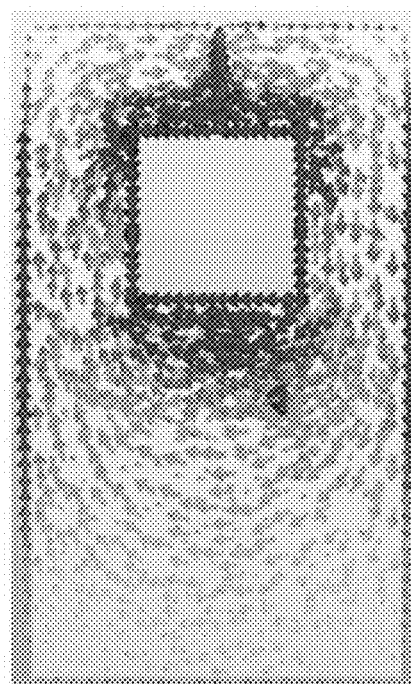

FIGS. 18A and 18B are views illustrating a comparison between current distributions according to the presence and absence of an electrical open path according to an exemplary embodiment in the present disclosure. FIG. 18A shows a current distribution when the electrical open path 180 is not provided, and (b) shows a current distribution when the electrical open path 180 is present.

Referring to FIG. 18B, it can be seen that, without the electrical open path 180, current may be concentrated in the regions adjacent to the antenna module 200 in the cover 100 (or back cover) for an electronic device, and referring to FIG. 18B, it can be seen that, with the electrical open path 180, current is distributed in the regions adjacent to the antenna module 200 and its periphery in the cover 100 for an electronic device, compared to FIG. 18A.

Figure 19A:
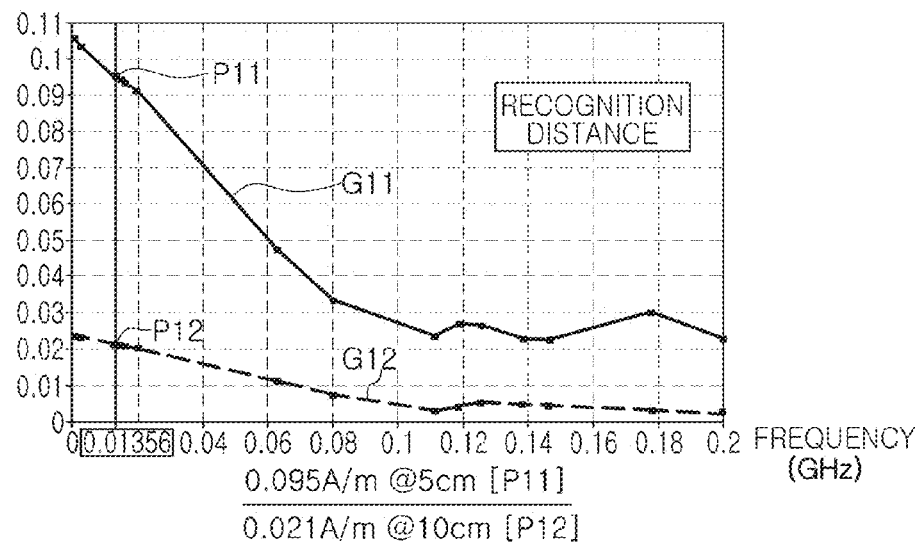
FIGS. 19A through 19B include graphs illustrating recognized distances according to the presence and absence of an electrical open path according to an exemplary embodiment in the present disclosure.
Figure 19B:
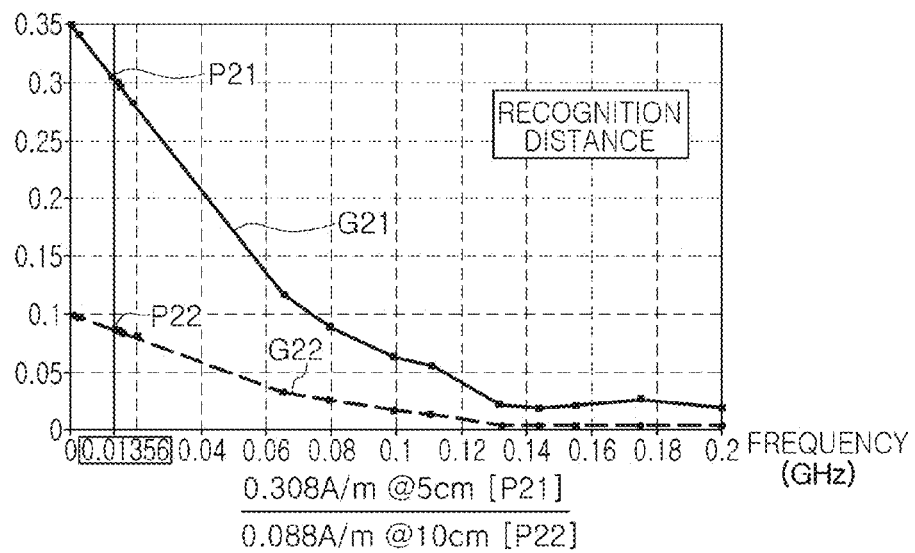

FIGS. 19A and 19B are graphs illustrating recognized distances according to the presence and absence of an electrical open path according to an exemplary embodiment in the present disclosure. FIG. 19A is a graph of a recognized distance when the electrical open path 180 is not provided, and FIG. 19B is a graph of a recognized distance when the electrical open path 180 is present.

Specifically, in FIG. 19A, G11 is a line obtained by measuring a magnetic field strength (H) at a distance of 5 centimeters by frequency without the electrical open path 180, and G12 is a line obtained by measuring magnetic field strength (H) at a distance of 10 centimeters by frequency without the electrical open path 180.

Referring to G11 and G12 in FIG. 19A, it can be seen that, without the electrical open path 180, magnetic field strengths (H) at the distances of 5 and 10 centimeters over NFC frequency (13.56 MHz) are 0.095 A/m (P11) and 0.021 A/m (P12), respectively.

Meanwhile, in FIG. 19B, G21 is a line obtained by measuring magnetic field strength (H) at a distance of 5 centimeters by frequency with the electrical open path 180, and G22 is a line obtained by measuring magnetic field strength (H) at a distance of 10 centimeters by frequency with the electrical open path 180.

Referring to G21 and G22 in (b) of FIG. 19, it can be seen that, with the electrical open path 180, magnetic field strengths (H) at the distances of 5 and 10 centimeters are 0308 A/m (P21) and 0.088 A/m (P22), respectively. Thus, it can be seen that, with the electrical open path 180, the recognition distance is enhanced.

Figure 20:
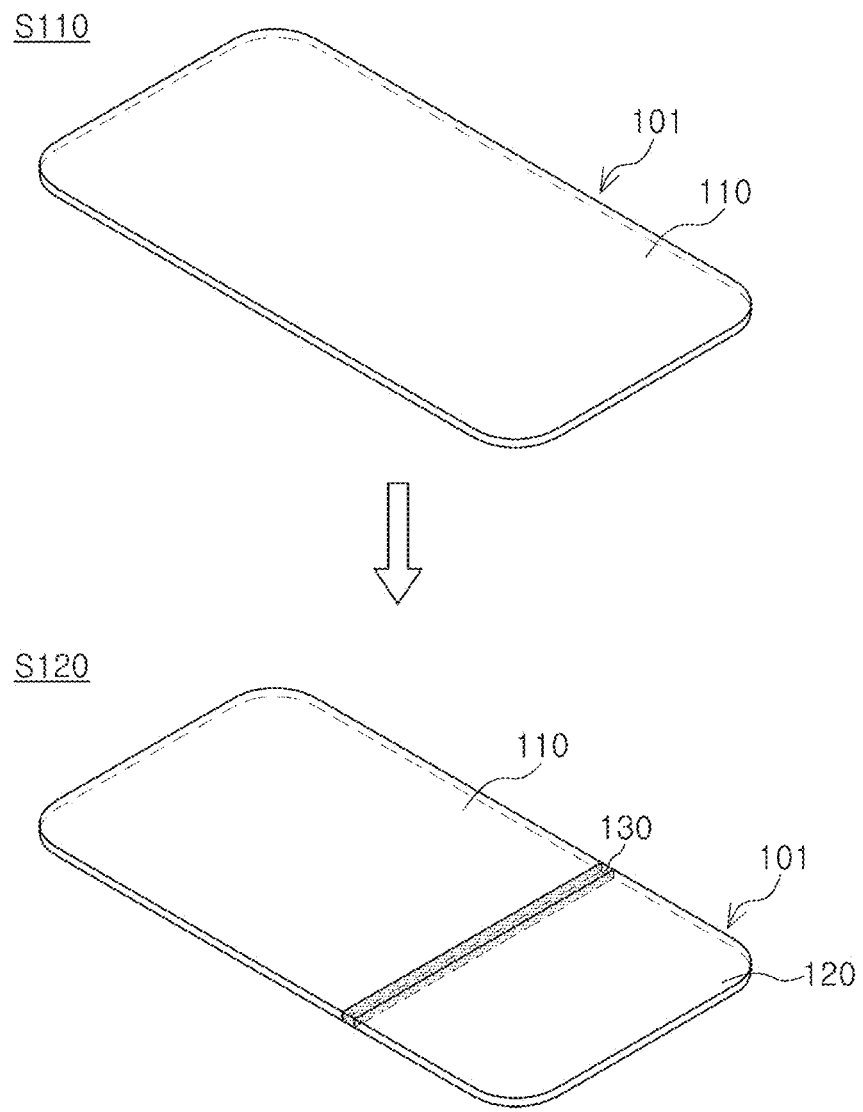
FIGS. 20 and 21 are views illustrating the sequence of a method for manufacturing a cover for an electronic device according to an exemplary embodiment in the present disclosure.
Figure 21:
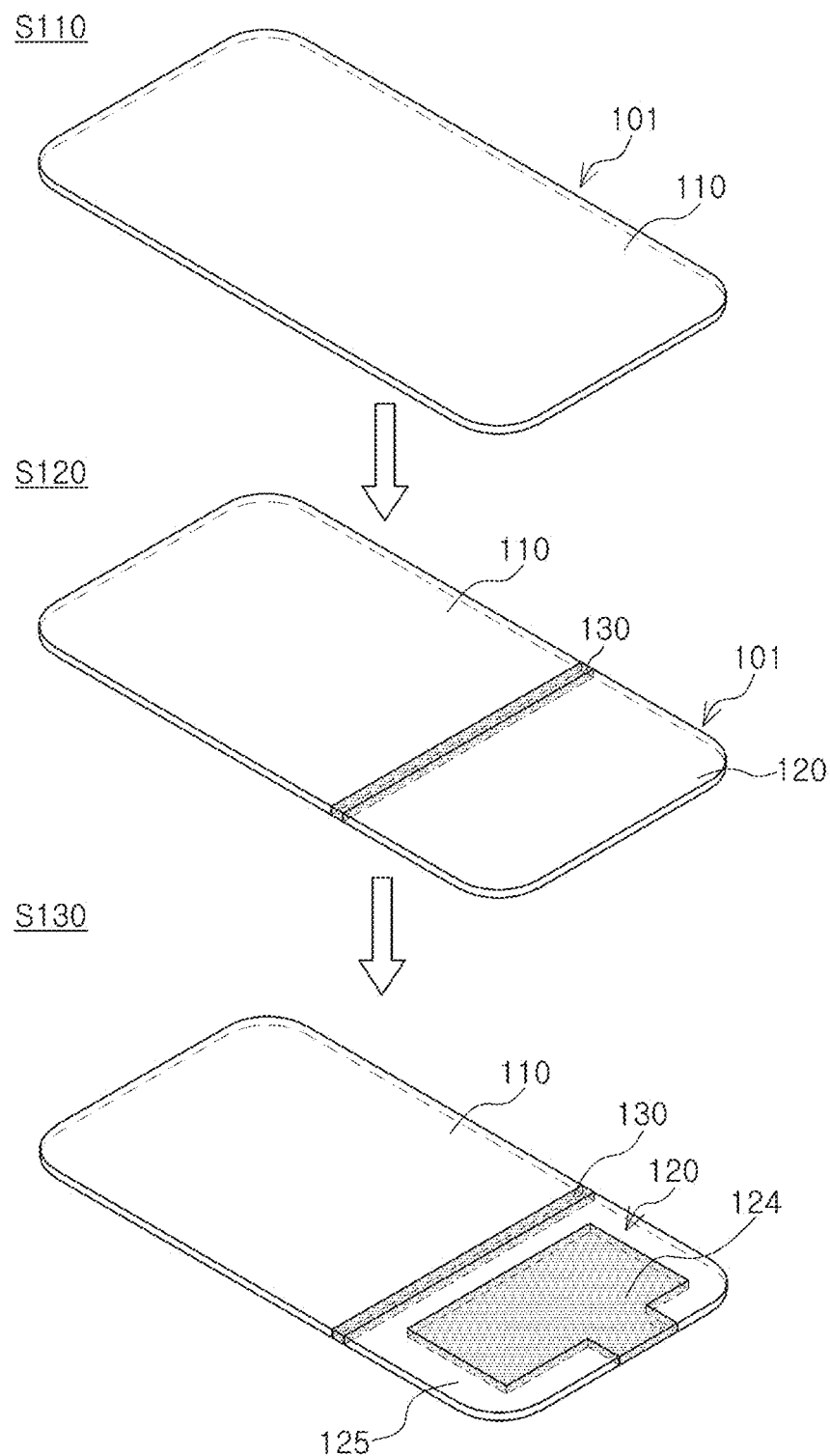

FIGS. 20 and 21 are views illustrating the sequence of a method for manufacturing a cover for an electronic device according to an exemplary embodiment in the present disclosure.

A method for manufacturing a cover for an electronic device according to an exemplary embodiment of the present disclosure will be described with reference to FIGS. 20 and 21.

In describing the method for manufacturing a cover for an electronic device according to an exemplary embodiment of the present disclosure hereinafter, the descriptions made above with reference to FIGS. 1 through 8 may be applied as is, and thus, redundant detailed descriptions may be omitted First, in operation S110, a metal plate 101 having a first metal region 110 formed of a metal may be prepared.

Next, in operation S120, in order to provide a second metal region 120 electrically separated from the first metal region 110 of the metal plate 101, a portion of the metal of the metal plate 101 may be demetallized through metal oxidation to form an electrical open path 130.

Referring to FIG. 21, the method for manufacturing a cover for an electronic device according to an exemplary embodiment of the present disclosure may further include operation S130 in addition to the method illustrated in FIG. 20. In operation S130, a portion of the second metal region 120 is demetallized through metal oxidation to form an antenna radiation part 125 including an antenna pattern formed as a non-oxidized metal region by the demetallized portion.

Here, as for operations S120 and S130, the manufacturing order illustrated in FIG. 21 is merely illustrative and the operations S120 and S130 may be performed during the same process.

An example of operation S120 of forming the electrical open path 130 will be described.

First, referring to FIGS. 21 and 8, a concave recess 131 may be formed along the boundary between the first metal region 110 and the second metal region 120, and the metal from an inner lower surface of the concave recess 131 to the other surface of the opposite side may be subsequently demetallized through metal oxidation to form a metal oxide layer 132.

Alternatively, in an exemplary embodiment of the present disclosure, during the process of forming the electrical open path 130, only the metal oxide layer 132 may be formed without the formation of a concave recess.

Figure 22:
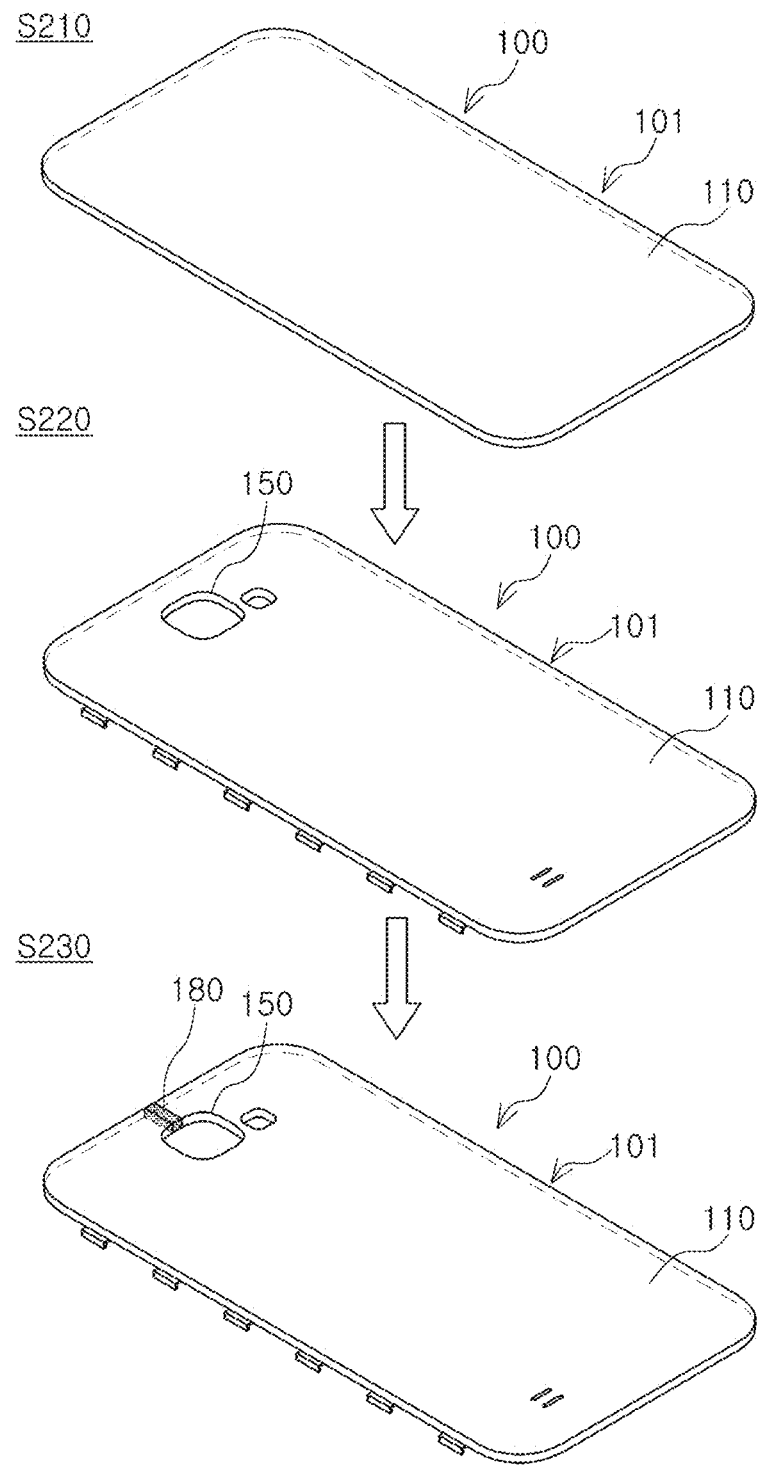
FIGS. 22 and 23 are views illustrating the sequence of a method for manufacturing a cover for an electronic device according to an exemplary embodiment in the present disclosure.
Figure 23:
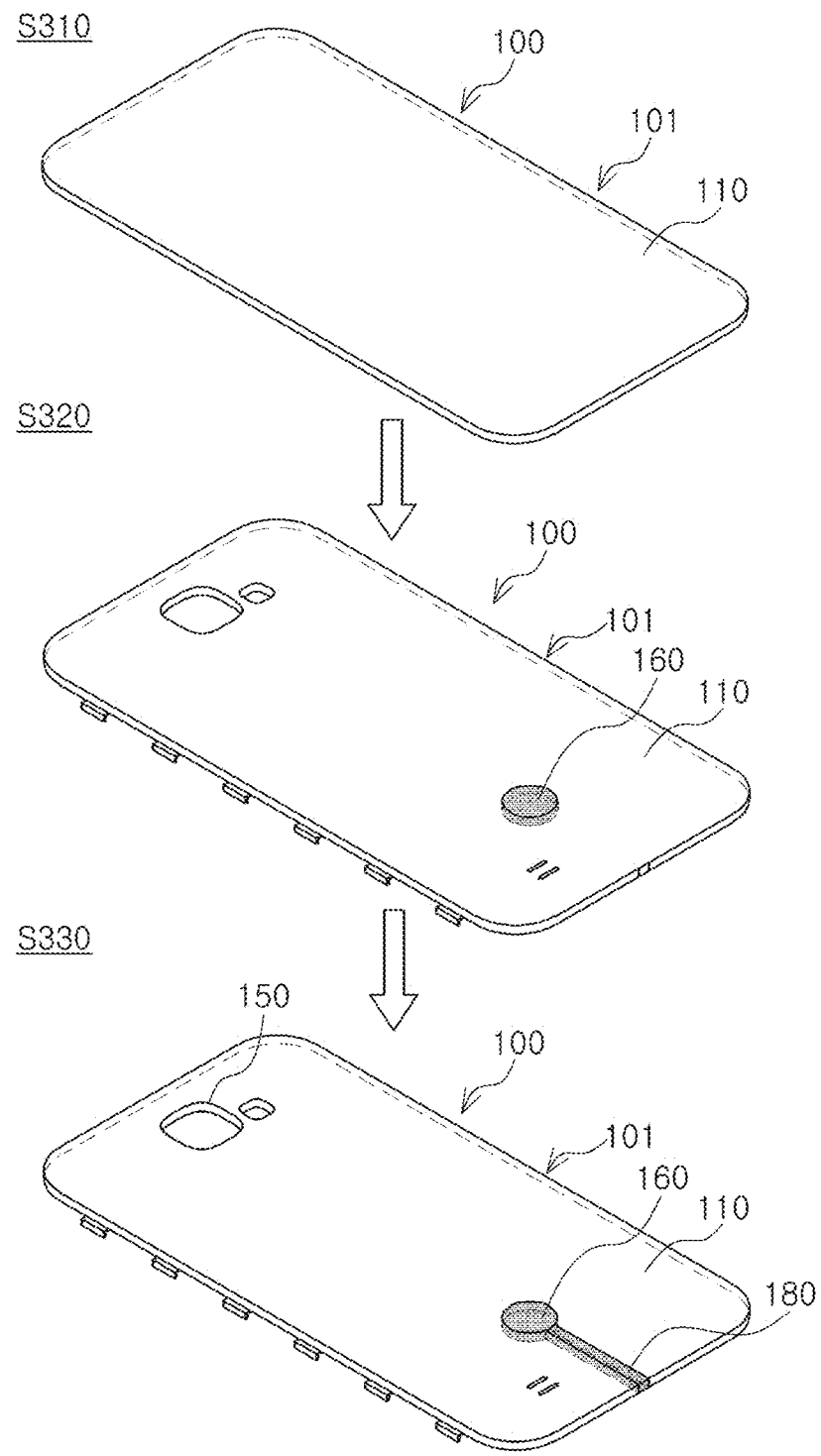

FIGS. 22 and 23 are views illustrating the sequence of a method for manufacturing a cover for an electronic device according to an exemplary embodiment in the present disclosure.

In describing the method for manufacturing a cover for an electronic device according to an exemplary embodiment of the present disclosure hereinafter, the descriptions made above with reference to FIGS. 9 through 19 may be applied as is, and thus, redundant detailed descriptions may be omitted The method for manufacturing a cover 100 for an electronic device according to an exemplary embodiment of the present disclosure will be described with reference to FIG. 22. First, in operation S210, a metal plate 101 having a first metal region 110 formed of a metal may be prepared.

Next, in operation S220, a through-hole 150 may be formed in a portion of the first metal region 110 of the metal plate 101 to allow spatial electromagnetic waves to enter and exit therethrough.

For example, the through-hole 150 may be formed through a metal working process such as die casting, a computerized numerical control (CNC) process, or the like.

And then, in operation S230, in order to change a path of electromagnetic waves in the main metal region 110, an electrical open path 180 may be formed by demetallizing the metal from the through-hole 150 to an end portion on one side of the first metal region 110 through metal oxidation.

For example, the electrical open path 180 may be formed through a surface treatment process as post-processing of the metal working process.

An example of operation S230 of forming the electrical open path 180 will be described.

First, referring to FIGS. 22 and 16, a concave recess 181 may be formed from the through-hole 150 to an end portion on one side of the first metal region 110 and a metal from an inner lower surface of the concave recess 181 to the other surface of the opposite side may be subsequently demetallized through metal oxidation to form a metal oxide layer 182.

Alternatively, in an exemplary embodiment of the present disclosure, during the process of forming the electrical open path 180, only the metal oxide layer 182 may be formed without formation of a concave recess.

The method for manufacturing a cover 100 for an electronic device according to an exemplary embodiment of the present disclosure will be described with reference to FIG. 23. First, in operation S310, a metal plate 101 having a first metal region 110 formed of a metal may be prepared.

Next, in operation S320, in order to allow spatial electromagnetic waves to enter and exit through a portion of the first metal region 110 of the metal plate 101, an electrical open region 160 may be formed by demetallizing a portion of the first metal region 110 through metal oxidation.

And then, in operation S330, in order to change a path of electromagnetic waves in the main metal region 110, an electrical open path 180 may be formed by demetallizing the metal from the electrical open region 160 to an end portion on one side of the first metal region 110 through metal oxidation.

Here, as for operations S320 and S330, the manufacturing order illustrated in FIG. 21 is merely illustrative and the operations S320 and S330 may be performed during the same process.

An example of operation S230 of forming the electrical open region 160 will be described.

First, referring to FIGS. 23 and 15, a concave recess 161 may be formed in a portion of the first metal region 110, and a metal from an inner lower surface of the concave recess 181 to the other surface of the opposite side may be subsequently demetallized through metal oxidation to form a metal oxide layer 162.

Alternatively, in an exemplary embodiment of the present disclosure, during the process of forming the electrical open region 160, only the metal oxide layer 162 may be formed without formation of a concave recess.

An example of operation of forming the electrical open path 180 will be described.

First, a concave recess 181 may be formed from the electrical open region 160 to an end portion on one side of the first metal region 110 and a metal from an inner lower surface of the concave recess 181 to the other surface of the opposite side may be subsequently demetallized through metal oxidation to form a metal oxide layer 182.

Alternatively, in an exemplary embodiment of the present disclosure, during the process of forming the electrical open path 180, only the metal oxide layer 182 may be formed without formation of a concave recess.

FIGS. 24 through 30 are views illustrating sequential processes of forming an electrical open region or electrical open path according to an exemplary embodiment in the present disclosure.

Figure 24:
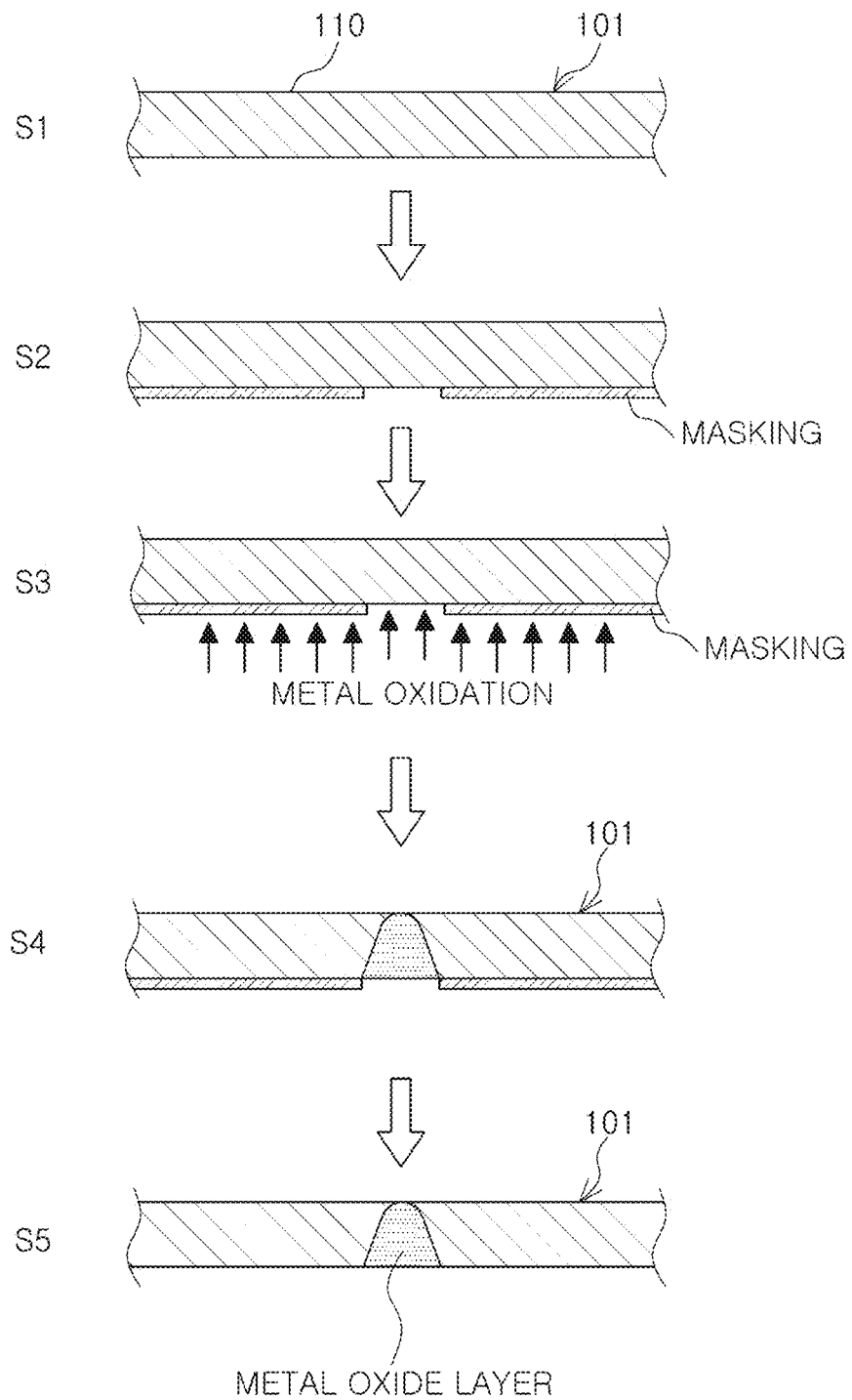
FIGS. 24 through 30 are views illustrating sequential processes of forming an electrical open region or electrical open path according to an exemplary embodiment in the present disclosure.

Referring to FIG. 24, a metal plate 101 may be prepared in operation S1, a lower surface of the metal plate 101 may be masked with a masking material with only a portion to be oxidized left to be unmasked in operation S2, metal oxidation may be performed on the exposed region of the masked metal plate 101 in operation S3, and the masking material may be removed in operation S4 to finally form a metal oxide layer on the metal plate 101 in operation S5. Here, the metal oxide layer corresponds to an electrical open region or an electrical open path.

Figure 25:
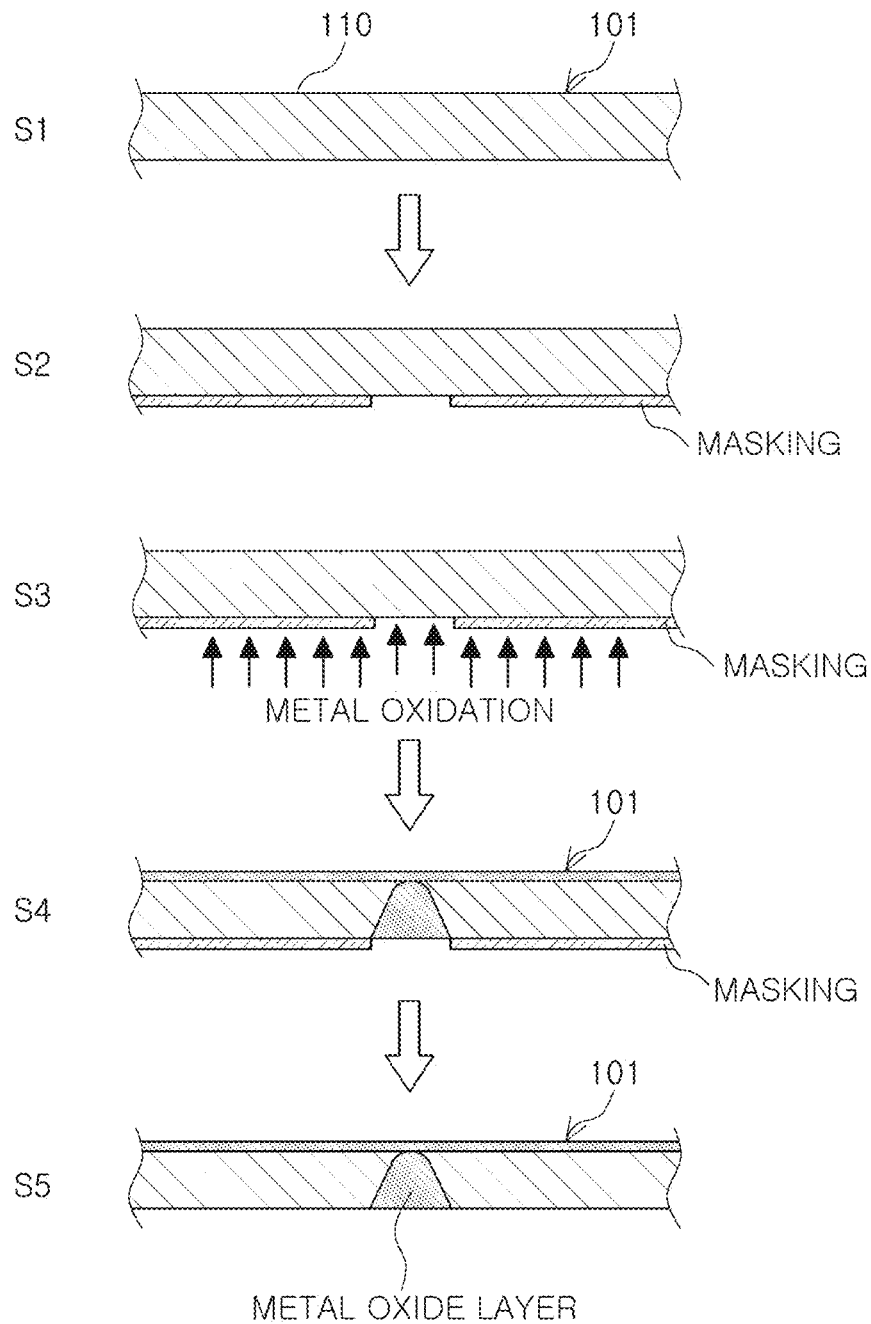

Referring to FIG. 25, a metal plate 101 may be prepared in operation S1, a lower surface of the metal plate 101 may be masked with a masking material with only a portion to be oxidized left to be unmasked in operation S2, metal oxidation may be performed on the exposed region of the masked metal plate 101 and on an upper surface of the metal plate 101 in operation S3, and the masking material may be removed in operation S4 to finally form a metal oxide layer on the metal plate 101 in operation S5.

Figure 26:
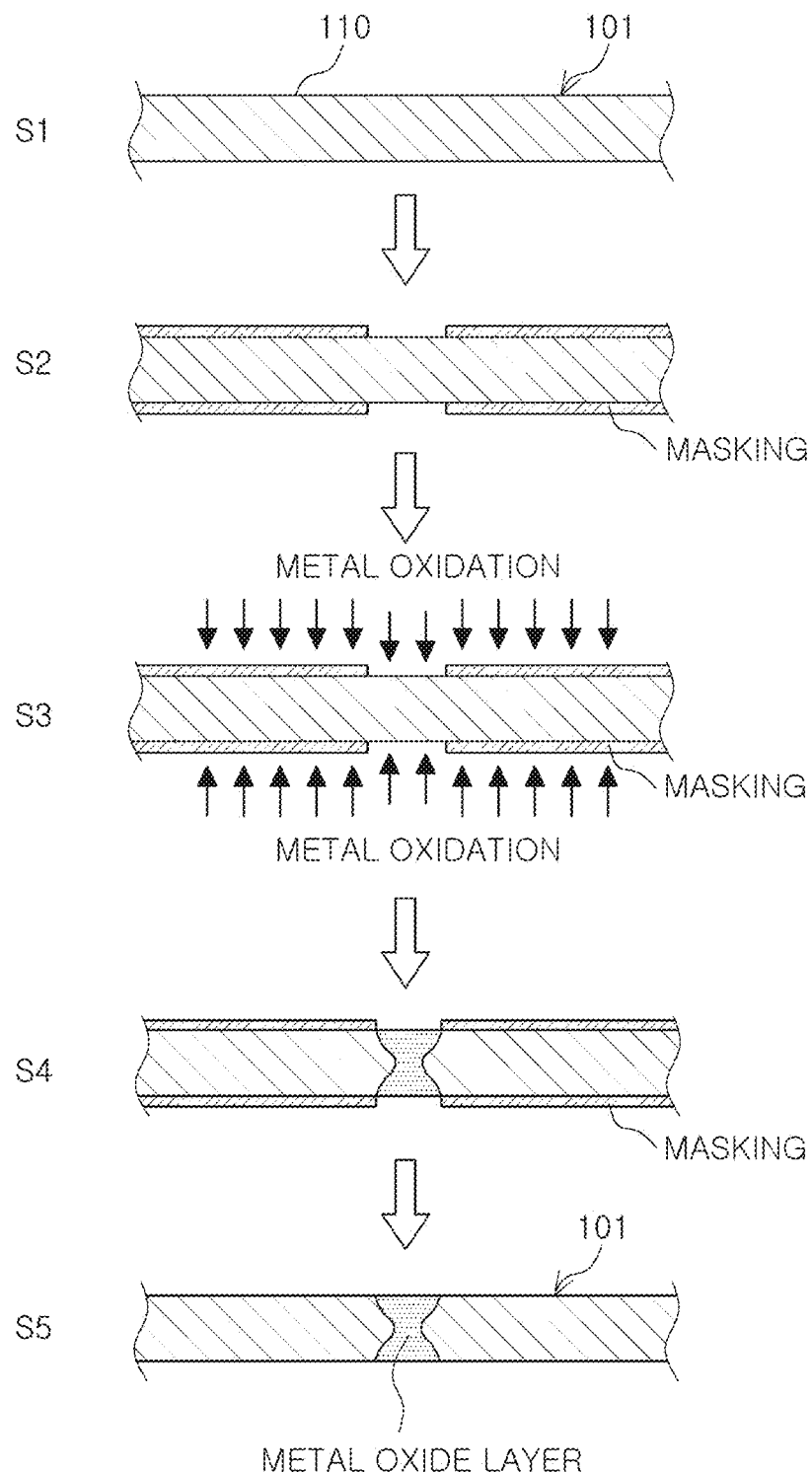

Referring to FIG. 26, a metal plate 101 may be prepared in operation S1, lower and upper surfaces of the metal plate 101 may be masked with a masking material with only portions to be oxidized left to be unmasked in operation S2, metal oxidation may be performed on the both exposed regions of the masked metal plate 101 in operation S3, and the masking material may be removed in operation S4 to finally form a metal oxide layer on the metal plate 101 in operation S5.

Figure 27:
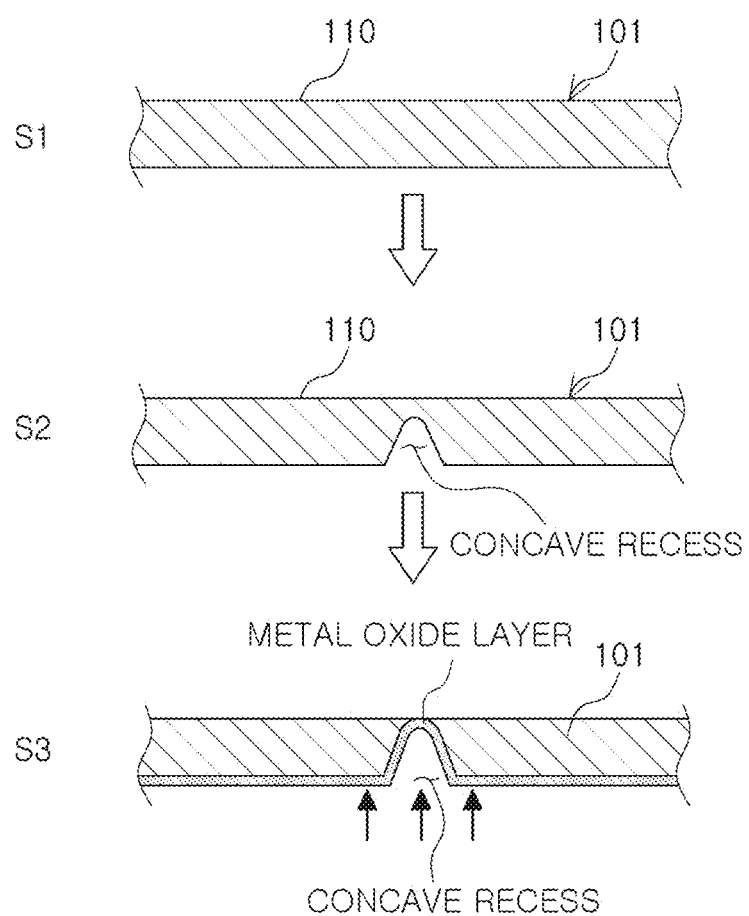

Referring to FIG. 27, a metal plate 101 may be prepared in operation S1, a concave recess is formed in a portion of a lower surface of the metal plate 101 to be oxidized in operation S2, and metal oxidation may subsequently be performed on the surface of the metal plate 101 with the concave recess formed thereon to finally form the concave recess and a metal oxide on the metal plate 101 in operation S3.

Figure 28:
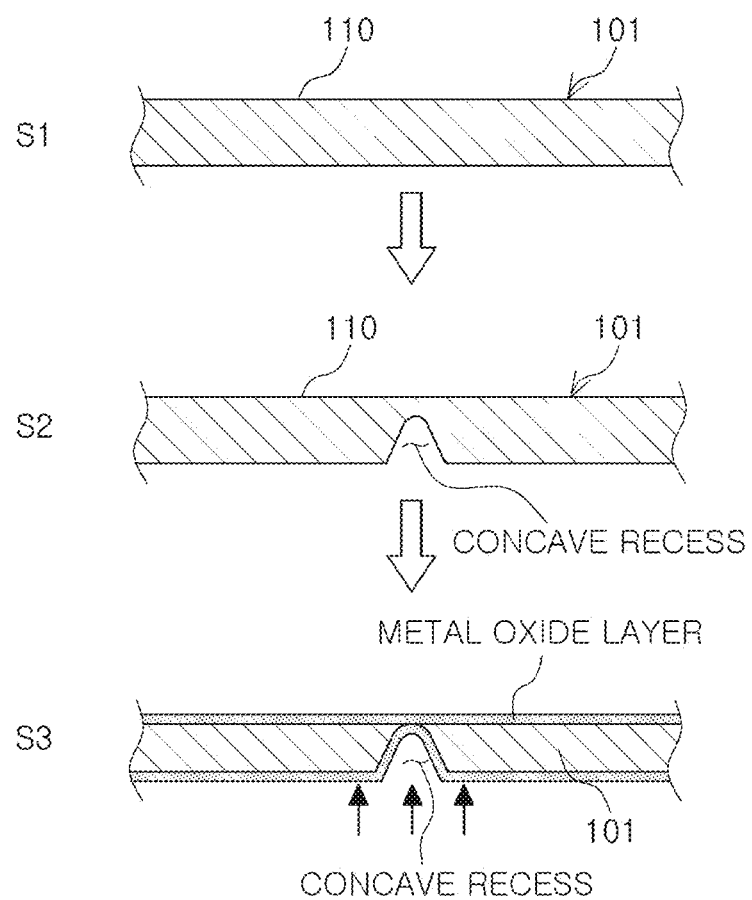

Referring to FIG. 28, a metal plate 101 may be prepared in operation S1, a concave recess is formed in a portion of a lower surface of the metal plate 101 to be oxidized in operation S2, and metal oxidation may subsequently be performed on the surface of the metal plate 101 with the concave recess formed thereon and on an upper surface of the metal plate 101 to finally form the concave recess and a metal oxide layer on the metal plate 101 in operation S3.

Figure 29:
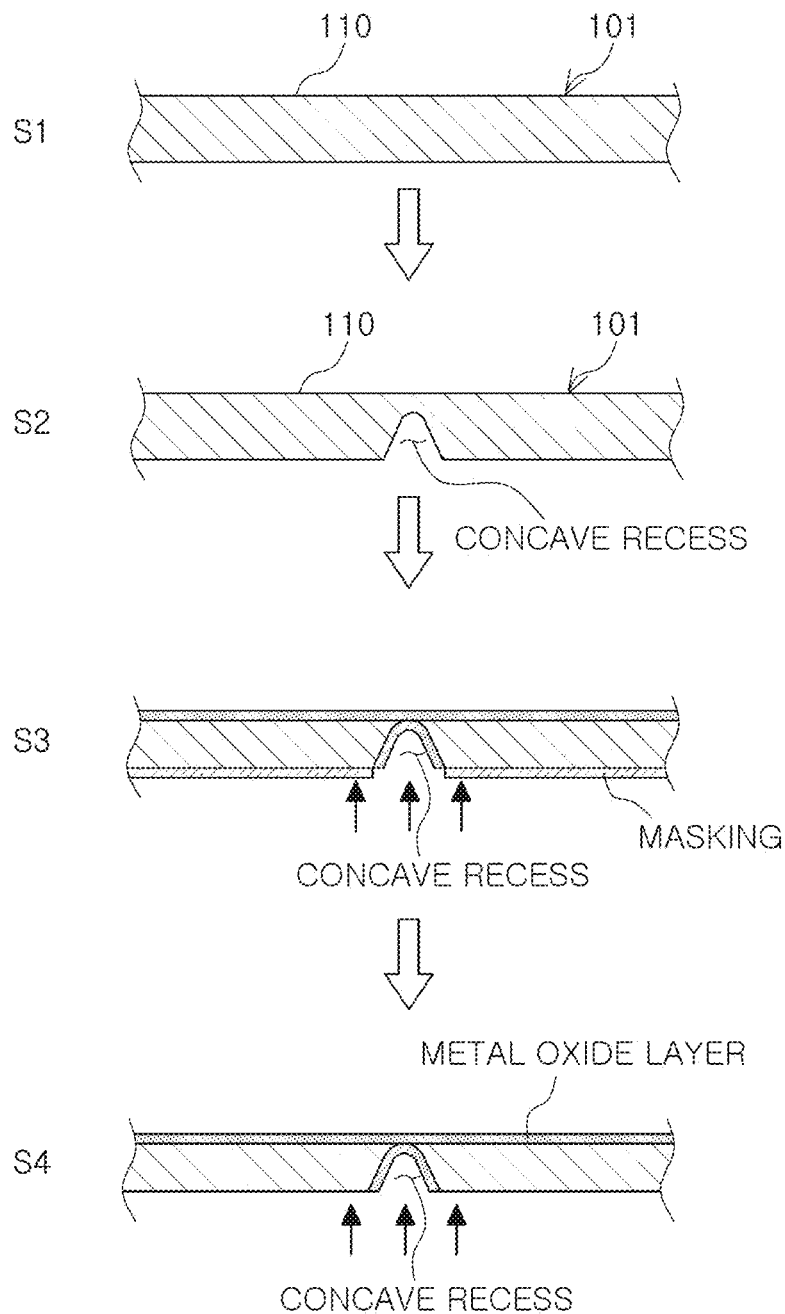

Referring to FIG. 29, a metal plate 101 may be prepared in operation S1, a concave recess is formed in a portion of a lower surface of the metal plate 101 to be oxidized in operation S2, the lower surface of the metal plate 101, excluding the concave recess, may be masked with a masking material in operation S3, and metal oxidation may subsequently be performed on the masked lower surface and an upper surface of the metal plate 101 to finally form the concave recess and a metal oxide layer on the metal plate 101 in operation S3.

Figure 30:
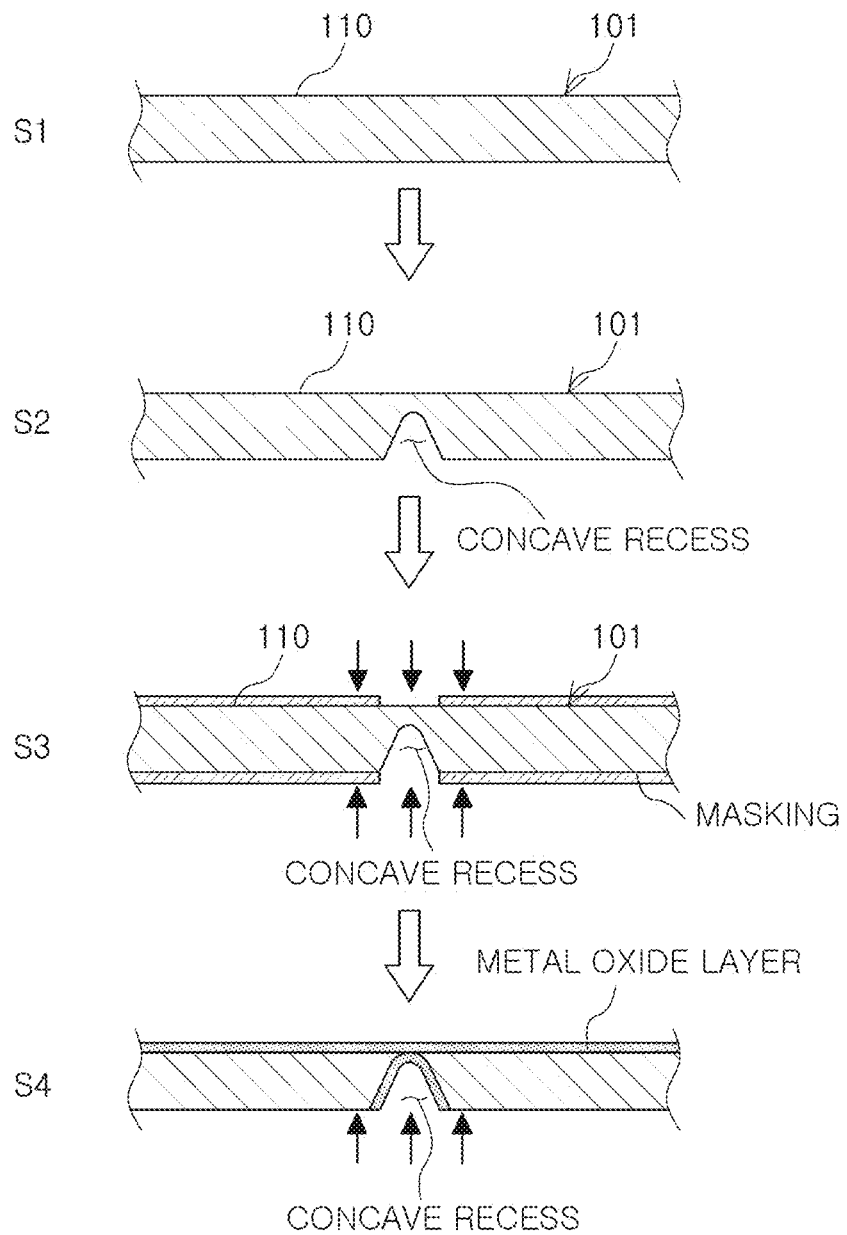

Referring to FIG. 30, a metal plate 101 may be prepared in operation S1, a concave recess is formed in a portion of a lower surface of the metal plate 101 to be oxidized in operation S2, the lower surface of the metal plate 101 excluding the concave recess and the other remaining surface excluding an upper surface opposing the concave recess may be masked with a masking material in operation S3, and metal oxidation may subsequently be performed on the masked lower and upper surfaces of the metal plate 101 to finally form the concave recess and a metal oxide layer on the metal plate 101 in operation S4.

Here, in an exemplary embodiment of the present disclosure, the concave recess may be formed on an inner surface of the metal cover such that it is not exposed outwardly when the metal cover is fastened to an electronic device. The lower surface of the metal plate may correspond to the inner surface and the upper surface of the metal plate may correspond to the outwardly exposed surface.

As set forth above, according to exemplary embodiments of the present disclosure, in an electronic device that requires an antenna, an electrical open region and/or open path may be utilized as an antenna even without a physical slit, and a path of an eddy current may be changed using an electrical opening region and/or open path without forming a physical slit on a metal cover, and thus, antenna performance may be enhanced.

Thus, since a physical slit is not present, an external design of a metal cover is not affected and an additional operation for removing drawbacks of a physical slit on appearance is not required.

While exemplary embodiments have been shown and described above, it will be apparent to those skilled in the art that modifications and variations could be made without departing from the spirit and scope of the present disclosure as defined by the appended claims.

What is claimed is:

1. A cover for an electronic device, the cover comprising:
 a plate integrally formed of a first metal region and a second metal region;
 an insulating region formed in the plate, and configured to electrically separate the first metal region and the second metal region from each other; and
 an antenna radiation part arranged in the second metal region,
 wherein the insulating region is formed by demetallizing a portion of the plate.

2. The cover of claim 1, wherein the metal is formed by at least one among deposition, plating, and painting processes.

3. The cover of claim 1, wherein the metal comprises at least one from a group consisting of aluminum, magnesium, zinc, titanium, stainless steel, and iron.

4. The cover of claim 1, wherein the metal oxidation process is an anodizing process.

5. The cover of claim 1, wherein the antenna radiation part is electromagnetically coupled to an internal antenna of the electronic device.

6. The cover of claim 1, wherein the antenna radiation part is electrically coupled to an electric circuit of the electronic device.

7. The cover of claim 1, wherein the antenna radiation part comprises an antenna pattern formed by the metal oxidation.

8. The cover of claim 1, wherein the insulating region comprises:
   a concave recess having a concave shape disposed along the boundary between the first metal region and the second metal region; and
   a metal oxide layer disposed on a surface of the plate in which the concave recess is disposed and extending from an inner lower surface of the concave recess to the surface of the plate.

9. The cover of claim 1, wherein the insulating region has a shape penetrating through the plate from the top surface to the bottom surface of the plate.

10. The cover of claim 1, further comprising a non-metallic cover disposed on the plate to cover the insulating region.

11. An antenna assembly comprising:
    a cover for an electronic device of claim 1; and
    an antenna module disposed inside the cover for an electronic device.

12. The antenna assembly of claim 11, wherein a portion of the cover is formed of a metal.

13. A method for manufacturing a cover for an electronic device, the method comprising:
    preparing a plate having a first metal region formed of a metal; and
    forming an insulating region by demetallizing a portion of the plate to create a second metal region electrically separate from the first metal region,
    wherein the plate is integrally formed of the first and second metal regions.

14. The method of claim 13, further comprising demetallizing a portion of the second metal region to form an antenna radiation part including an antenna pattern formed as a non-oxidized metal region by the demetallized portion.

15. The method of claim 13, wherein the metal is formed by at least one of deposition, plating, and painting processes.

16. The method of claim 13, wherein the metal comprises at least one from a group consisting of aluminum, magnesium, zinc, titanium, stainless steel, and iron.

17. The method of claim 13, wherein the metal oxidation process is an anodizing process.

18. The method of claim 13, wherein the forming of an insulating region comprises:
    forming a concave recess along the boundary between the first metal region and the second metal region; and
    demetallizing the metal from an inner lower surface of the concave recess to the surface side of the plate in which the concave recess is formed through metal oxidation to form a metal oxide layer.

19. An electronic device, comprising the cover of claim 1, wherein the first metal plate is grounded.

20. The electronic device of claim 19, wherein the electronic device is a smartphone, a TV broadcast receiving set-top box, a notebook computer, or a television set.

* * * * *